US010352688B2

(12) United States Patent
Uffenkamp et al.

(10) Patent No.: US 10,352,688 B2
(45) Date of Patent: Jul. 16, 2019

(54) DEVICE AND METHOD FOR MEASURING THE TREAD DEPTH OF A TIRE

(71) Applicant: Beissbarth GmbH, Munich (DE)

(72) Inventors: Volker Uffenkamp, Ludwigsburg (DE); Jochen Wingbermuehle, Hannover (DE); Guenter Nobis, Nuertingen (DE); Marc Luther, Peine (DE)

(73) Assignee: Beissbarth GmbH, Munich (DE)

( * ) Notice: Subject to any disclaimer, the term of this patent is extended or adjusted under 35 U.S.C. 154(b) by 182 days.

(21) Appl. No.: 14/652,395

(22) PCT Filed: Nov. 4, 2013

(86) PCT No.: PCT/EP2013/072925
§ 371 (c)(1),
(2) Date: Jun. 15, 2015

(87) PCT Pub. No.: WO2014/095142
PCT Pub. Date: Jun. 26, 2014

(65) Prior Publication Data
US 2015/0330773 A1    Nov. 19, 2015

(30) Foreign Application Priority Data
Dec. 21, 2012   (DE) .................. 10 2012 224 260

(51) Int. Cl.
*G01B 11/22*  (2006.01)
*G01M 17/02*  (2006.01)
(Continued)

(52) U.S. Cl.
CPC ........... *G01B 11/22* (2013.01); *G01B 11/245* (2013.01); *G01B 11/25* (2013.01); *G01M 17/027* (2013.01)

(58) Field of Classification Search
None
See application file for complete search history.

(56) References Cited

U.S. PATENT DOCUMENTS 4,095,464 A * 6/1978 Breedijk ................ G01B 11/00
73/146
5,054,918 A * 10/1991 Downing ........... G01B 11/2504
33/203
(Continued)

FOREIGN PATENT DOCUMENTS

CN     1158159 A    8/1997
CN   101196438 A    6/2008
(Continued)

OTHER PUBLICATIONS

International Search Report for PCT/EP2013/072925, dated Nov. 4, 2013.

*Primary Examiner* — Jill E Culler
(74) *Attorney, Agent, or Firm* — Norton Rose Fulbright US LLP; Gerard Messina

(57) ABSTRACT

A device for measuring the tread depth of a tire includes measuring modules situated transversely with respect to the running direction of the tire and connected to a shared evaluation device. Each measuring module includes (i) an illumination device which is configured and situated in such a way that during operation it projects at least one light line onto the tread to be measured, and (ii) at least one image recording device recording at least one image of at least one area of the tread to be measured. The at least one illumination device and the at least one image recording device are configured and situated in such a way that the illumination direction of the illumination device and the image recording direction of the image recording device are oriented neither in parallel to one another nor orthogonally with respect to the tread.

21 Claims, 14 Drawing Sheets

(51) Int. Cl.
*G01B 11/245* (2006.01)
*G01B 11/25* (2006.01)

(56) References Cited

U.S. PATENT DOCUMENTS

| | | | | |
|---|---|---|---|---|
| 5,245,867 | A * | 9/1993 | Sube | G01B 11/22 |
| | | | | 73/146 |
| 5,485,406 | A * | 1/1996 | Wada | G01B 11/22 |
| | | | | 73/146 |
| 5,789,668 | A * | 8/1998 | Coe | G01B 21/20 |
| | | | | 73/146 |
| 5,995,650 | A * | 11/1999 | Migdal | G01B 11/2518 |
| | | | | 345/419 |
| 6,069,966 | A * | 5/2000 | Jones | G01B 11/22 |
| | | | | 73/146 |
| 6,532,811 | B2 * | 3/2003 | Turner | G01M 17/02 |
| | | | | 73/146 |
| 7,578,180 | B2 | 8/2009 | Lionetti et al. | |
| 7,724,377 | B2 | 5/2010 | Sakoda et al. | |
| 7,797,995 | B2 * | 9/2010 | Schafer | G01B 11/22 |
| | | | | 73/146 |
| 7,995,834 | B1 * | 8/2011 | Knighton | G01B 11/245 |
| | | | | 250/234 |
| 8,538,166 | B2 * | 9/2013 | Gordon | G01B 11/25 |
| | | | | 382/201 |
| 2008/0037033 | A1 | 2/2008 | Ersue et al. | |
| 2012/0008148 | A1 | 1/2012 | Pryce et al. | |
| 2012/0236288 | A1 * | 9/2012 | Stanley | G01B 11/2513 |
| | | | | 356/4.01 |

FOREIGN PATENT DOCUMENTS

| | | |
|---|---|---|
| CN | 102388290 A | 3/2012 |
| CN | 102803938 A | 11/2012 |
| DE | 1 809 459 | 6/1970 |
| DE | 43 16 984 | 8/1994 |
| DE | 197 05 047 | 8/1998 |
| DE | 10 2006 062 447 | 7/2008 |
| DE | 10 2009 016 498 | 10/2010 |
| EP | 04 69 948 | 2/1992 |
| EP | 1 394 503 | 3/2004 |
| EP | 1 952 092 | 8/2008 |
| EP | 1 967 835 | 9/2008 |
| JP | H07 92058 | 4/1995 |
| JP | 2008 185511 | 8/2008 |
| WO | WO 97/07380 | 2/1997 |
| WO | 2008061770 A1 | 5/2008 |
| WO | WO 2008/061770 | 5/2008 |

* cited by examiner

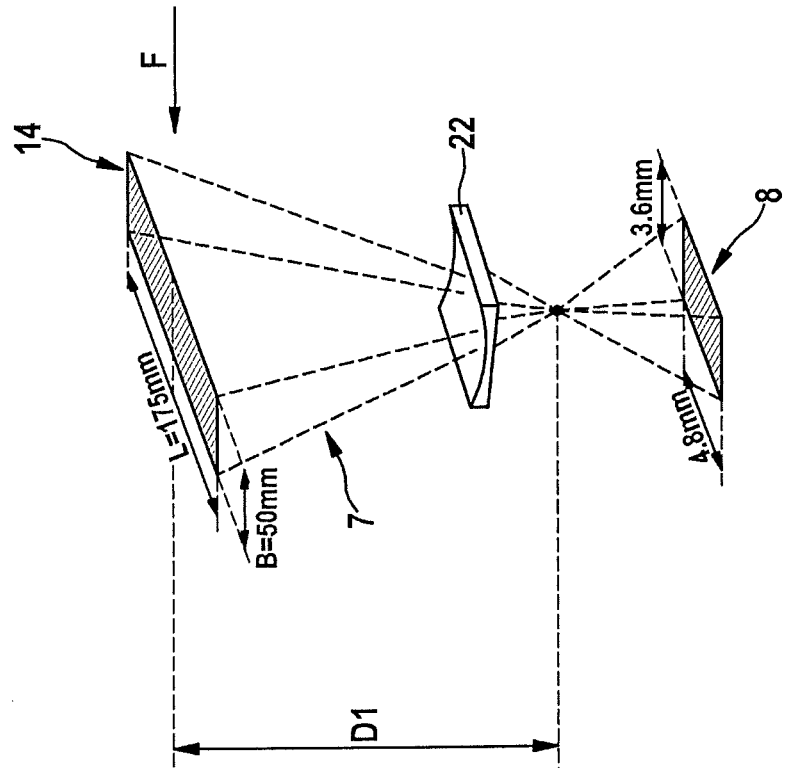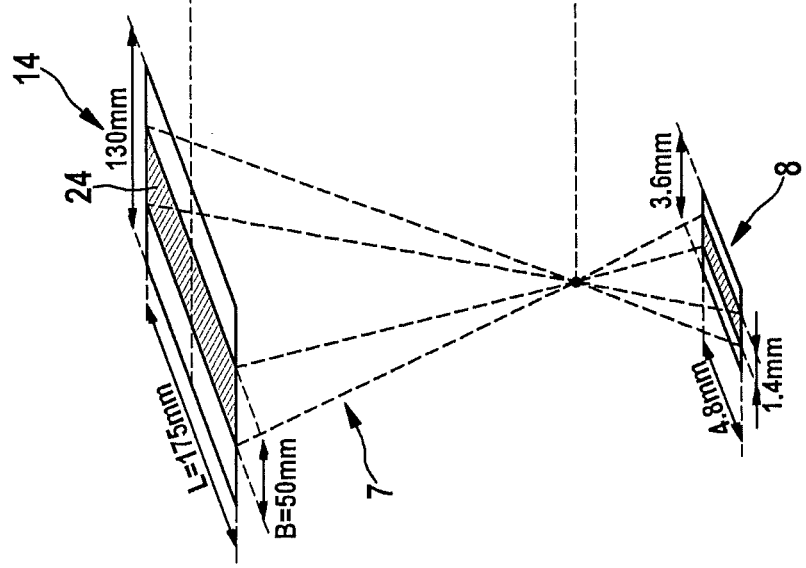

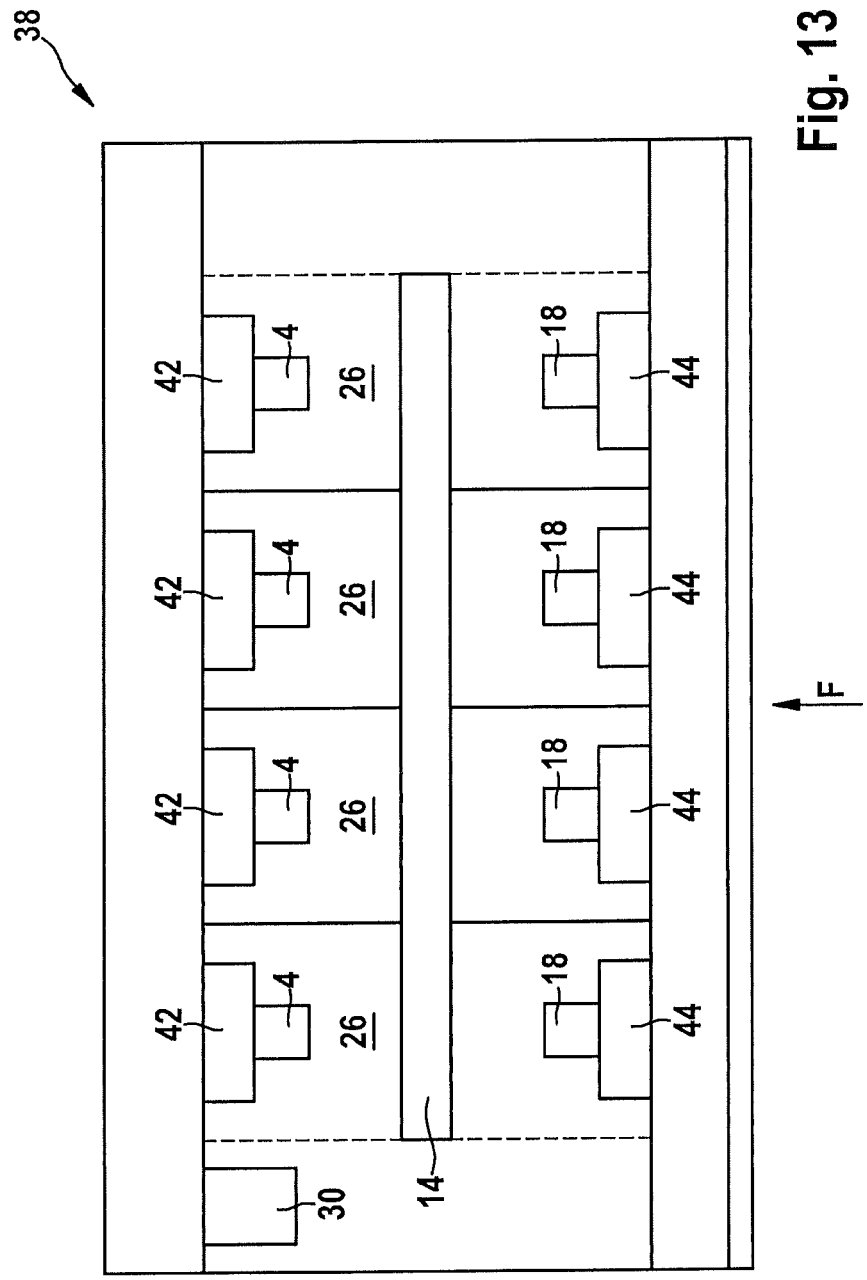

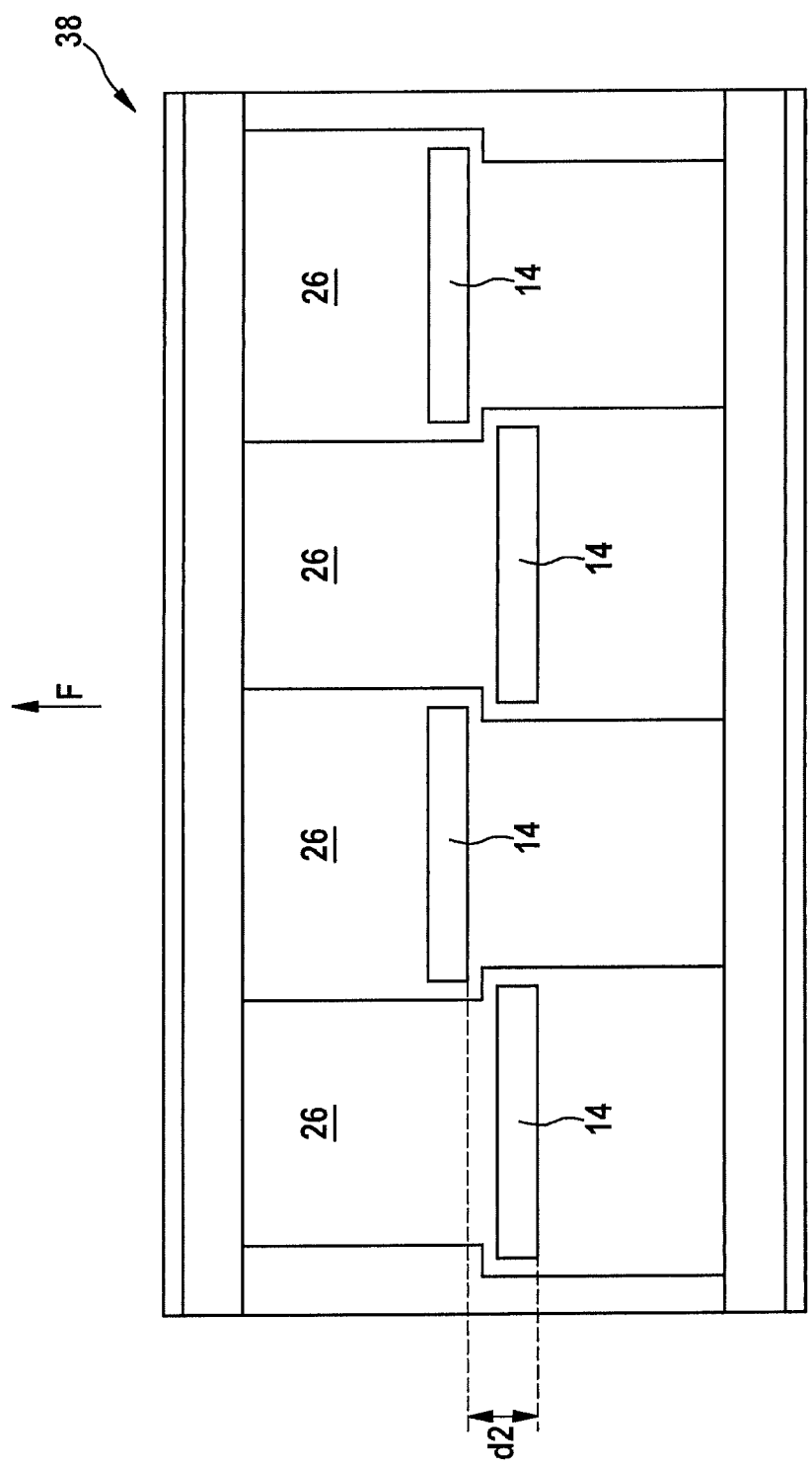

DEVICE AND METHOD FOR MEASURING THE TREAD DEPTH OF A TIRE

BACKGROUND OF THE INVENTION

1. Field of the Invention

The present invention relates to a device and a method for measuring the tread depth of at least one tire, in particular a motor vehicle tire.

2. Description of the Related Art

Various methods for manual or automatic tread depth measurement, mechanically or contactlessly measuring methods, and methods for measuring when the vehicle or tire is stationary or rolling are known for measuring the tread depth of tires.

Triangulation methods using laser scanners for tread depth measurement on a roller dynamometer are described in published German patent application document DE 197 05 047 A1 and European patent document. EP 1 394 503 B1, for example.

German patent document DE 43 16 984 describes a method for measuring the tread depth when the tire is stationary or is traveling over a measuring device. A triangulation sensor situated on a movable slide is moved along a line transverse to the rolling direction of the tire.

Published international patent application document WO 97/07380 A2 describes the use of a light section method, using one or multiple light sections for measuring as a tire travels over, in which the measuring device moves together with the vehicle.

German patent document DE 1 809 459 describes a light section method for measuring the tread depth as a tire travels over. The tread depth is measured along a single line in parallel to the rotational axis of the tire. The method is based essentially on the examination of shadows of the tread which are generated by an obliquely incident light source.

Published European patent application document EP 04 69 948 A1 likewise describes a device for automatically ascertaining the tread depth of motor vehicles in moving traffic. The measuring device is situated beneath the roadway surface. Instead of a light line transverse to the running direction of the tire, multiple light spots are measured, and the tread depth is deduced based on differences in light density of the imaged points. For increasing the accuracy, multiple measuring devices are situated in succession in the travel direction.

Published German patent application document DE 10 2009 016 498 A1 provides a method for ascertaining the tread depth of a vehicle tire, the tire being mounted on a vehicle, and in the method the tire is rolled over a measuring station or is stopped on same. The tread of the tire is optically scanned on at least one measuring line transverse to the rolling direction of the tire, a beam fan which emanates from a light source being reflected on the tire surface and a signal of the reflected beam fan being recorded by a sensor, and the signal of the reflected beam fan being evaluated with the aid of a triangulation method.

In published German patent application document DE 10 2006 062 447 A1, an area of the tire tread is likewise measured with the aid of a light section triangulation method while the tire rolls over a gap. The method provides for guiding an illumination line over the tread surface, transversely with respect to the rolling direction of the wheel, with the aid of a prism rotating at high speed. Due to the illumination line which moves in parallel, the entire section of the tire may be sequentially scanned with a high density while the tire surface situated on the gap is in the idle state relative to the measuring device.

European patent EP 0 469 948 B1, European patent EP 1 952 092 B1, and U.S. Pat. No. 7,578,180 B2 describe further variants of triangulation methods for measuring the tread depth while a tire travels over.

The object of the present invention is to provide an improved device and an improved method for measuring the tread depth of a wheel in particular of a motor vehicle, which are suitable for numerous tire widths, have high measuring accuracy, and are easy to operate and carry out.

BRIEF SUMMARY OF THE INVENTION

A device according to the present invention for measuring the tread depth of a tire includes multiple measuring modules which are situated transversely with respect to the running direction of the tire and connected to a shared evaluation device. Each measuring module includes at least one illumination device which is designed and situated in such a way that during operation it projects at least one light line onto the tread to be measured, and includes at least one image recording device which is designed for recording at least one image of at least one area of the tread to be measured. The at least one illumination device and the at least one image recording device are designed and situated in such a way that the illumination direction of the illumination device and the image recording direction of the image recording device are oriented neither in parallel to one another nor orthogonally with respect to the tread of the tire.

A method for measuring the tread depth of a tire, using a device according to the present invention, includes the following steps:
rolling the tire to be measured over the device;
with the illumination devices, projecting at least one light line in each case onto the tread to be measured, while the tread is rolling over the device;
with the image recording devices, recording at least one reflected image of the tread in each case while the tread is rolling over the device;
identifying the projected light lines in the recorded images and associating them with one of the illumination devices; and
evaluating the recorded images of the light lines in order to determine the depth of the tread.

A device according to the present invention and a method according to the present invention allow a robust, convenient measurement of the tread depth of motor vehicle tires of virtually any width to be achieved, using conventional components, in particular using commercially available, inexpensive surface image sensors.

In one specific embodiment, the illumination devices of the measuring modules are designed in such a way that they project a pattern having multiple light lines onto the tread. The robustness of the measurement and the accuracy of the measuring results may be even further improved by using a pattern having multiple light lines instead of a single light line.

In one specific embodiment, the illumination devices each include at least one diffractive optical element ("DOE") for generating the light pattern. Diffractive optical elements may have a simpler design than conventional optical elements for generating light line patterns, they generate a uniform intensity distribution, and, unlike optical masks, for example, almost fully utilize the energy of the incident light beam.

In one specific embodiment, the illumination devices are designed in such a way that the individual light lines are encoded so that they are clearly identifiable and in particular unambiguously associatable with one of the measuring modules. The identifiability of the individual light lines is necessary in order to achieve high measuring accuracy in conjunction with a large number of lines.

The encoding may include a spatial encoding, a temporal encoding, or a combination thereof. A spatial encoding may be achieved, for example, by a suitably designed diffractive optical element which generates a line pattern having variable line spacing. Alternatively, the width of the lines, the line pattern, and/or the line shape may also be varied.

Alternatively or additionally, temporal encoding of the lines may be carried out by projecting the light lines not simultaneously, but, rather, in a predefined chronological sequence onto the tire tread.

In one specific embodiment, the image recording devices each include at least one optical element which is designed for optically distorting the image recording range of the image recording device, in particular for compressing it in the running direction of the tire and/or for expanding it transverse to the running direction of the tire. Due to this type of optical element, optimal use may be made of the predefined recording surface of the surface image sensor, so that the accuracy of the measurement may be improved for the same financial outlay. A cylindrical lens in particular may be used as the optical element.

Alternatively or additionally, the utilization of the recording surface of the image sensor may be improved by situating the generally rectangular surface image sensor rotated by 90°, so that the direction of the tire tread, which runs in parallel to the running direction of the tire, in which a higher resolution is necessary or desired is imaged in the direction of the surface image sensor which has the higher number of pixels.

In one specific embodiment, the measuring modules are designed in such a way that the illumination devices and image recording devices of the various measuring modules are offset relative to one another in the running direction of the tire to be measured, i.e., situated in succession in the running direction of the tire. Such an offset arrangement reliably prevents the light lines of one measuring module from being projected into the measuring range of an adjacent measuring module. In this case it is not necessary to encode the light lines in such a way that the light lines of the individual measuring modules may be distinguished from one another; the illumination devices of the individual measuring modules may therefore have an identical design. Furthermore, with the aid of measuring modules situated in succession in the travel direction of the vehicle, the speed of the vehicle may be determined without the need for an additional sensor.

In one specific embodiment, the diffractive optical elements of directly adjacent measuring modules are situated offset relative to one another, so that the mutually overlapping light patterns which are generated by the illumination devices of directly adjacent measuring modules are encoded differently. Due to the different encoding, the light patterns may be unambiguously associated with one of the measuring modules. If, for example, in a first measuring module a diffractive optical element is designed and situated in such a way that the spacing of the light lines generated by the diffractive optical element in the travel direction of the vehicle increases from the rear to the front, an identically designed diffractive optical element of a directly adjacent second measuring module is situated rotated by 180° in such a way that the spacing of the light lines of the light pattern generated by the second diffractive optical element in the travel direction of the vehicle decreases from the rear to the front.

The diffractive optical element of a third measuring module adjacent to the second measuring module is then once again situated in the same orientation as the diffractive optical element of the first measuring module, and the diffractive optical element of a fourth measuring module once again has the same orientation as the diffractive optical element of the second measuring module, and so forth.

In this way, mutually overlapping areas of the light patterns of directly adjacent measuring modules have different line spacings, so that the light lines over the entire vehicle width may be unambiguously associated with one of the measuring modules.

In one specific embodiment, the angle between the direction in which the illumination device projects the light line onto the tire and the image recording direction of the associated image recording device is 20° to 45°, in particular 40°. An angle in the range of 20° to 45° represents a good compromise between preferably high measuring accuracy and preferably low shadowing, both of which increase with an increasingly larger angle between the projection direction of the illumination device and the image recording direction of the associated image recording device.

In one specific embodiment, the opening angle of the image recording device is ±20°. Assuming a groove width of 4 mm and a groove depth of 8 mm for a typical new tire of a passenger vehicle, a design of image recording device 18 with an effective opening angle of $\varphi=\pm20°$ has proven to be well suited, taking into account the shadowing which occurs.

In one specific embodiment, the device includes at least one additional sensor which is designed for detecting the approach of a tire and/or the illumination of the tire tread. Such an additional sensor allows the device to be transferred into the measuring state in a timely manner when a vehicle approaches. When the distance of the additional sensor from the measuring device is known, the approach speed of the vehicle may also be determined. It may thus be reliably established whether a possible erroneous measurement might be attributed to an excessive traveling speed of the vehicle.

In one specific embodiment, a method according to the present invention includes determining the speed of the tire and terminating the method when a permissible maximum speed is exceeded. Erroneous measurements which result from an excessive speed of the vehicle may thus be reliably avoided.

In one specific embodiment, a method according to the present invention additionally includes comparing the ascertained tread depth to a predefined limiting value and outputting a warning when the determined tread depth is less than the predefined first limiting value. In this way, the driver of the vehicle is reliably warned when the tread depth of at least one tire is less than the permissible minimum tread depth (first limiting value).

In one specific embodiment, a method according to the present invention also includes comparing the tread depths of the tires on one axle and outputting a warning when the difference between the tread depths of the tires on one axle is less than a predefined second limiting value. In this way, the driver of the vehicle is reliably notified of possible chassis problems which result in differing wear of the tires.

In one specific embodiment, a method according to the present invention additionally includes optimizing imaging parameters, which in particular include the illumination intensity of the illumination device and/or the integration time of the image recording device. It is thus ensured that the method is always carried out with virtually optimal imaging parameters in order to achieve preferably high quality of the imaging, and consequently, high measuring accuracy.

In summary, the present invention in the described specific embodiments has the following advantages, among others:

By using multiple measuring modules on each side of the vehicle, an optimal imaging geometry transverse to the running direction of the tire is ensured, even for large measuring widths, for example passenger vehicle tread widths of 1,200 mm to 1,800 mm, truck tread widths of 1,600 mm to 2,100 mm, all the way to vans and trucks with dual tires, so that the method and the device are usable for passenger vehicles of all types, but also for trucks, buses, and multi-axle vehicles.

The provided modular design allows measuring systems to be easily provided, using complete measuring widths of any size which are adapted to the particular need.

The present invention provides a robust approach which is also able to handle rough test conditions. The device has no moving parts, and thus avoids wear on moving parts.

Due to the provided installation in the roadway, on the roadway, or in a speed bump, a device according to the present invention may be easily used at a variety of locations, in particular in entryways of repair shops, service stations, drive-in facilities, drive-through facilities, and parking lots, for example.

Due to the measurement on a rolling vehicle (wheel), a convenient approach is provided for the operator of the measuring station and for the driver.

The measurement takes place from below, so that potentially interfering light influences from the surroundings are minimized. Fluctuations in ambient light (daytime, nighttime, sunlight, clouds, etc.) are compensated for by an optimized illumination.

Underexposure and overexposure are avoided by adapting the illumination intensity and integration time. By situating the image recording device and also the illumination device at an angle with respect to the tire surface which is larger than a right angle, interfering reflections which could skew the measuring results are reliably avoided.

Due to the measurement in the tire contact surface from below through a slot in the device, measuring errors due to tread deformation in the contact surface under load are avoided.

Additional correction methods due to different measuring angles with respect to the orthogonal to the tire surface at different tire diameters are not necessary.

The measurement takes place with the wheel in a steady-state resting condition, in a manner of speaking, so that measuring errors due to motion blurs are avoided.

A high level of measuring accuracy is achieved. By generating a large number of light lines which are projected onto the tire surface, a high scanning density is achieved which allows reliable recognition of wear indicators integrated into the tread, and of objects (for example, jammed-in small stones) in the tread grooves of the tire which could skew the measuring result. By encoding the light lines, the images of the reflected light lines may be reliably associated and evaluated, even for small spacings between the light lines.

The display of the test result in the form of a signal light, and in addition a verbal recommendation for action for the driver, simplifies the operability and avoids errors in assessing the measuring results.

Exemplary embodiments of the present invention are explained in greater detail below with reference to the appended figures.

BRIEF DESCRIPTION OF THE DRAWINGS

FIG. 4b shows an enlarged detail from FIG. 4a.

FIGS. 7a and 7b depict an improved utilization of a surface image sensor, using a distorted optical image.

FIG. 13 shows a measuring device which includes four identical measuring modules adjacently situated in a drive-over channel, including a shared slot, in the top view.

FIG. 14 shows a measuring device which includes four identical measuring modules adjacently situated in a drive-over channel, each situated rotated by 180° with respect to one another, in the top view.

DETAILED DESCRIPTION OF THE INVENTION

Figure 1:
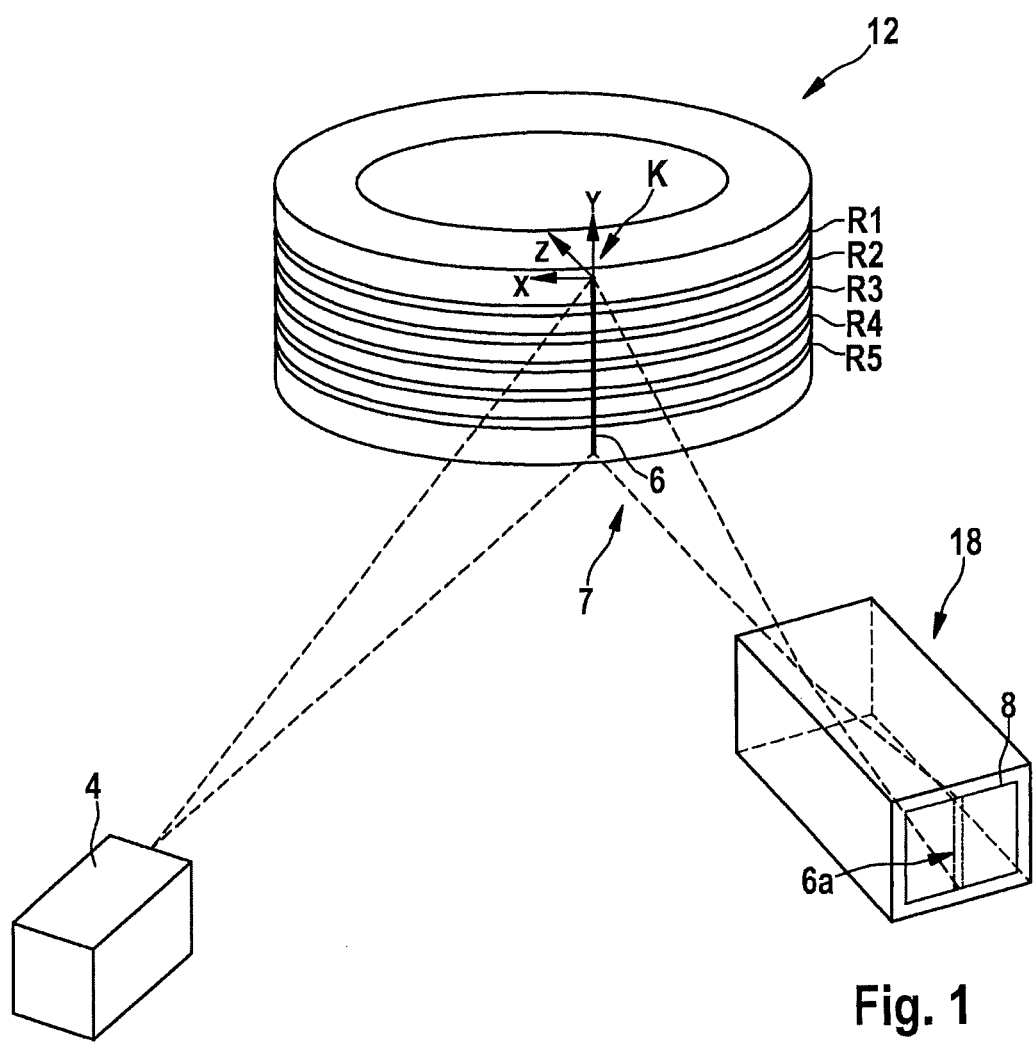
FIG. 1 depicts in a schematic illustration the measuring principle used here for tread depth measurement.

FIG. 1 depicts in a schematic illustration the measuring principle for tread depth measurement on a tire 12 with the aid of the light section triangulation method, with a simplified illustration of the tread of tire 12 which includes five longitudinal grooves R1, R2, R3, R4, R5.

An object coordinate system K is oriented in such a way that the depth extension of the tread is aligned in parallel with the Z axis of object coordinate system K.

An illumination device 4 projects at least one light line 6 onto the tread of tire 12 provided with a profile. An image recording device 18 is equipped with a lens, not shown in FIG. 1, and a surface image sensor 8 (a CCD or CMOS image sensor, for example). Due to the different perspective between illumination device 4 and image recording device 18, and the difference in depth between the tire tread and the groove base, light line 6 projected onto the tread is imaged on surface image sensor 8 of image recording device 18 in the form of mutually offset line segments 6a.

Figure 2:
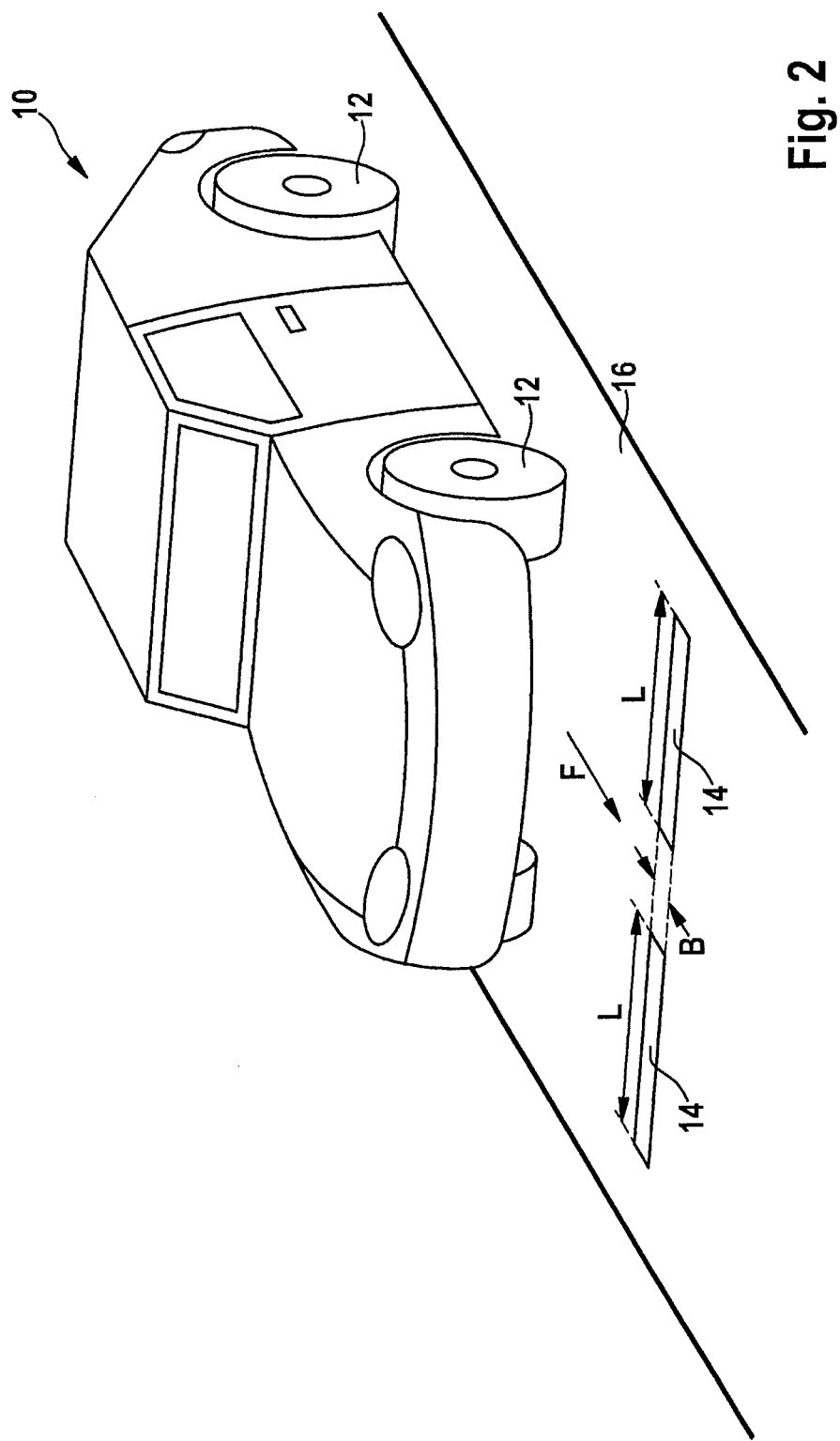
FIG. 2 shows a schematic perspective view of a measuring station for tread depth measurement.

FIG. 2 shows a measuring station which includes a roadway 16 in which two slots 14 in the lane of a vehicle 10 approaching in travel direction F are provided. The measurement takes place while vehicle 10 is traveling with its wheels, i.e., tires 12, over at least one of the elongated slots 14 which are provided in roadway 16 and which in their longitudinal extension are aligned transversely with respect to the running direction of tires 12 of motor vehicle 10.

Transverse to travel direction F of vehicle 10, slots 14 have an extension (length) L which corresponds at least to the width of the maximum contact surface of tires 12 to be measured. However, the variance of the tread widths of vehicles 10 to be measured must also be taken into account to allow automatic measurement of a preferably large number of different types of vehicles. When the measuring device is also intended to be suitable for utility vehicles, in particular also the variance of the tread widths and tire widths of vans and trucks with or without dual tires must be taken into account.

On the one hand, width B of slots 14 in parallel to travel direction F should be selected to be much smaller than the smallest contact surface of typical tires 12, and on the other hand, width B of slots 14 should also be selected in such a way that driving comfort is not adversely affected due to driving over the slots.

Slots 14 allow the measurement of the tread depth to be carried out in a partial area of the tread of tire 12 to be checked which is not under load. This has the advantage that measuring errors which would result due to squeezing of the tire material in the contact surface of tire 12, necessarily caused by wheel load of vehicle 10, are avoided.

In addition, a measurement in the area of the contact surface of tire 12 corresponds, in a manner of speaking, to a measurement in the resting position, since, while rolling on roadway 16, each point of the tread of tire 12 moves along a cycloid having the physical property that its speed at the point of contact point is zero. This has the advantage that there is no additional measuring uncertainty due to motion blurs.

A further advantage of measuring the contacting tire tread from below through a slot 14 is that the ambient light is shaded to a great extent by the body of vehicle 10 and tire 12 itself, and the measurement is thus largely independent of changing ambient conditions (such as daytime, nighttime, sunlight, clouds, etc.).

For measuring passenger vehicles having tread widths between 1,200 mm and 1,800 mm in the entryways of repair shops, service stations, or parking lots, etc., assuming a maximum speed of 15 km/h, for example a slot 14 having a length L between 500 mm and 700 mm and a width B between 30 mm and 50 mm on each side of the vehicle has proven to be well suited. In the following description, a slot length of L=700 mm and a slot width of B=50 mm are assumed as an example.

Illumination device 4 and image recording device 18 are situated in such a way that the measuring range of the image recording device corresponds to slot 14 in roadway 16. The measuring principle requires a fixed, invariable association between the object (tire 12), illumination device 4, and image recording device 18. Measuring the partial area of the tire contact surface, not under load, through slot 14 in roadway 16 ensures that the depth extension of the tire tread, or, stated another way, of normal vector n of tire 12, has an identical orientation for each tire 12 at the time of the measurement. In this arrangement, the measuring system is also to be calibrated.

Figure 3:
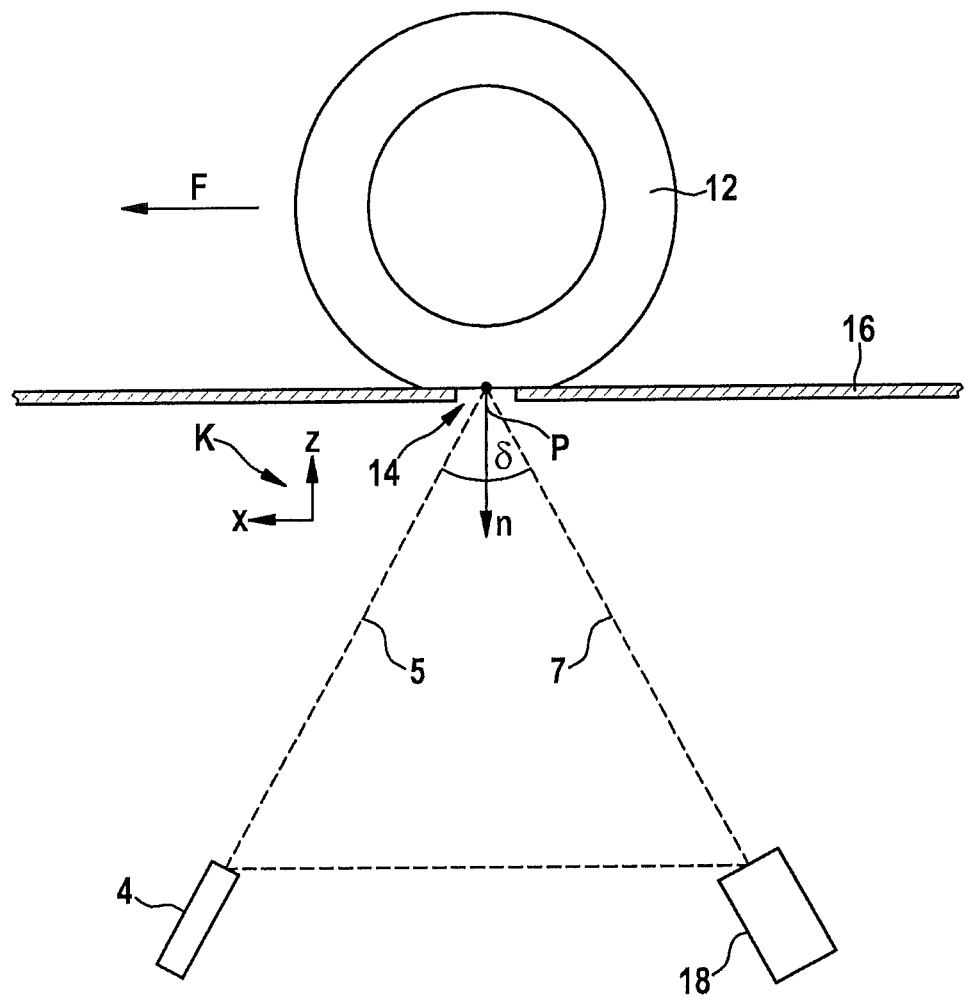
FIG. 3 shows a system for measuring the tread depth, in a schematic side view.

FIG. 3 shows an arrangement for measuring the tread depth in a schematic side view. Angle δ denotes the angle between plane 5 in which the light from illumination device 4 is projected onto the tire tread, and imaging plane 7 at object point P.

The accuracy of the light section triangulation method is a function of the imaging geometry (image scale, intersection angle of the spatial beams) and the quality of the line point determination, denoted as point measuring accuracy spx. Point measuring accuracy spx is not only a function of the image measuring algorithm used for detecting light line 6, but also includes measuring uncertainties resulting from the surface texture, reflections, or speckle effects of the illumination. Under optimal conditions, and when the width of imaged light line 6 extends over multiple pixels on surface image sensor 8, a subpixel point measuring accuracy spx of ⅓ pixel may be achieved by interpolation. Formula (1) allows an estimation of depth measuring accuracy dZ of an optical 3D triangulation system.

$$dZ = \frac{spx \times mb \times ps}{\tan(\delta)}, \quad (1)$$

where
mb: image scale between the object space and the image space
ps: size of a sensor pixel in mm
δ: intersection angle between light plane 5 and imaging beam 7 at object point P.

It is apparent from formula (1) that the measuring accuracy increases with increasing angle δ. For practical reasons, for example limitations of the available installation space, and the risk that objects which are not flat may be shaded when angle δ is too large, as discussed below, the system is usually designed for an angle δ between 20° and 45°, in particular 40°.

The arrangement of illumination device 4 and image recording device 18 shown in FIG. 3 has the additional advantage that devices 4, 18 are well protected from dirt which may possibly fall down through slot 14.

Illumination device 4 is oriented in such a way that light lines 6 are projected onto the tire tread in parallel or virtually in parallel to the longitudinal side of slot 14, transversely with respect to travel direction F of vehicle 10 or the running direction of tire 12.

Figure 4A:
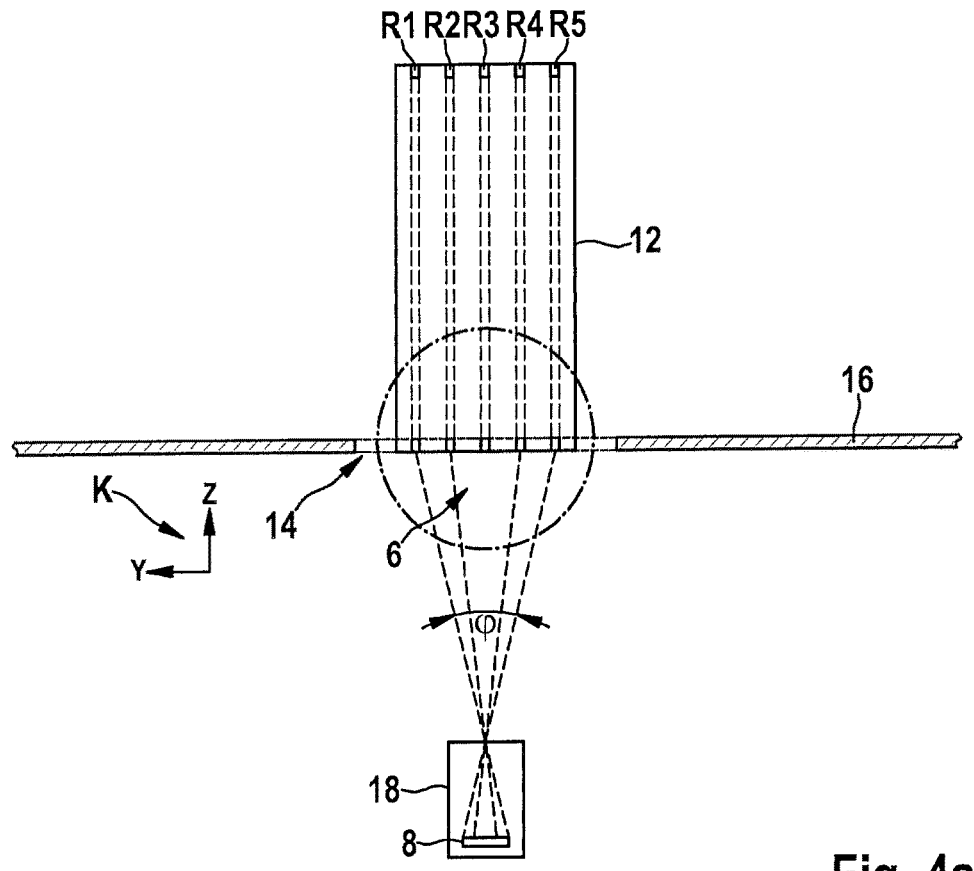
FIG. 4a shows a section perpendicular to the plane of the roadway through the center of the tire, orthogonally with respect to the travel direction of the vehicle.

FIG. 4a shows a section perpendicular to the plane of roadway 16 through the center of tire 12, orthogonally with respect to travel direction F of vehicle 10. The tread of tire 12 is illustrated as an example in simplified form with five longitudinal grooves R1, R2, R3, R4, R5. A light line 6 projected by illumination device 4 (not illustrated in FIG. 4a) onto the tread of tire 12 is recorded by surface image sensor 8 of image recording device 18.

Figure 4B:
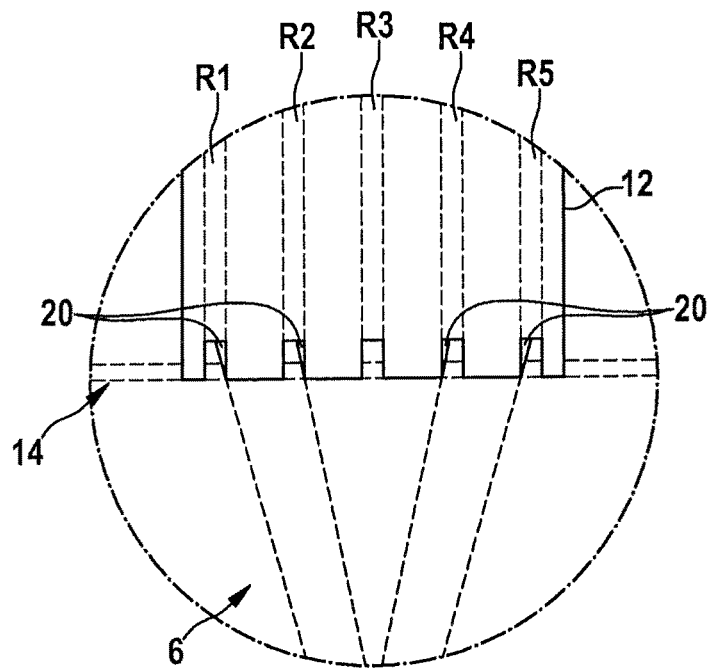

The enlarged illustration of the tire tread in FIG. 4b shows that, as a function of the width and depth of grooves R1, R2, R3, R4, R5, during the projection of light lines 6, shadowings 20 occur with increasing opening angle φ of image recording device 18 which, above a certain opening angle φ, make a tread depth measurement impossible, since the base of grooves R1, R2, R3, R4, R5 is not, or is insufficiently, illuminated.

Figure 5:
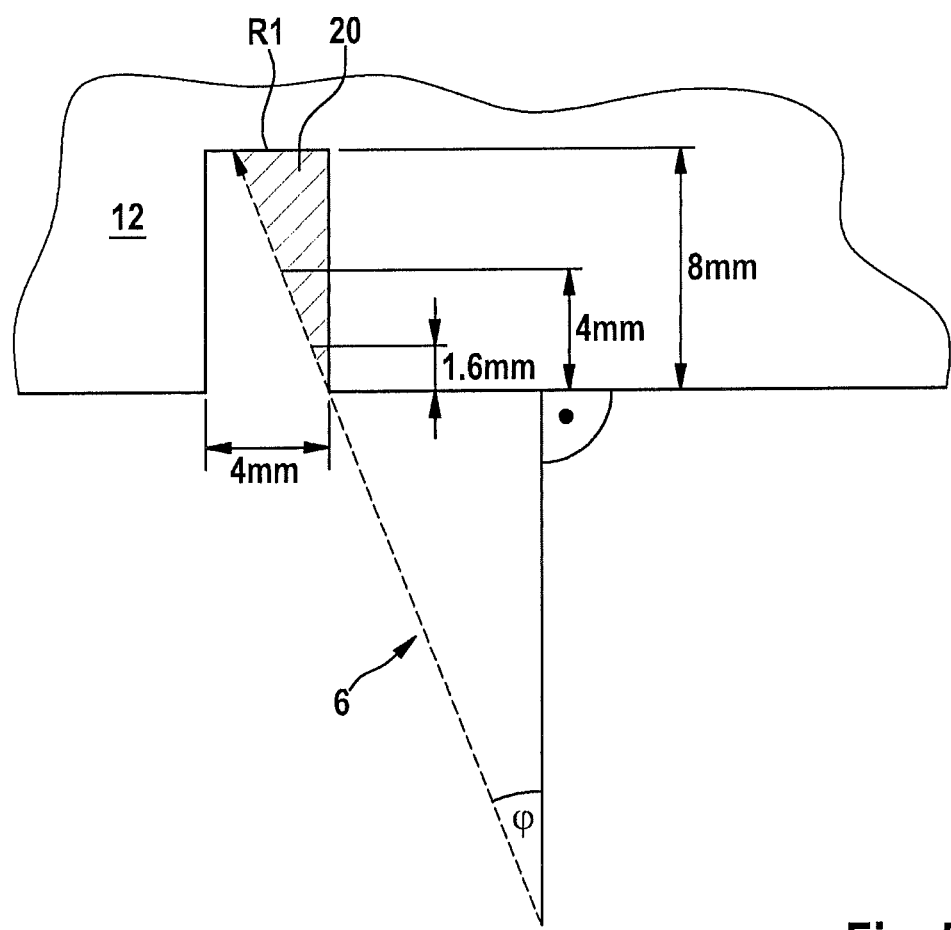
FIG. 5 shows a detail of a tire which includes a tread groove, and the geometric relationships of the shadowing.

FIG. 5 shows a detail of tire 12 which includes a tread groove R1, and the geometric relationships of shadowing 20.

A tabular overview of the resulting shadowings 20 in percent of the groove width as a function of the groove width, the tread depth, and opening angle φ shows that shadowing 20 is limited to a maximum of 27% for a groove depth of 8 mm.

| Groove | φ [°] | Groove depth [mm] | | |
|---|---|---|---|---|
| | | 1.6 | 4.0 | 8.0 |
| R1 | +20 | 85% | 64% | 27% |
| R2 | +10 | 93% | 82% | 65% |
| R3 | 0 | 100% | 100% | 100% |
| R4 | −10 | 93% | 82% | 65% |
| R5 | −20 | 85% | 64% | 27% |

Assuming a groove width of 4 mm and a groove depth of 8 mm for a typical new tire on a passenger vehicle, a design of the measuring system with an effective opening angle of φ=±20° has proven to be well suited.

Although the measurement of affected tread grooves R1, R2, R3, R4, R5 is limited by shadowing 20, but it may be improved by additional criteria:

On the one hand, the extent of shadowing 20 becomes less the smaller the tread depth, i.e., the greater the wear of the tread. Thus, the measuring accuracy increases the more closely the tread depth approaches, or is below, the critical warning value of the legally prescribed minimum depth.

On the other hand, the measuring accuracy may also be increased by increasing the number of light lines 6 projected onto the tread. Instead of measuring a complete groove base with a single light line 6, four light lines 6, with only a 25% measurable groove base, may theoretically give the same measuring result for this groove. Due to erroneous measurements which are to be expected, a much larger number of light lines 6 is advantageous, as discussed below.

Typical passenger vehicle tire treads generally include longitudinal grooves and subgrooves extending at an angle to same which form systematically repeating blocks having a size of 4 mm to 8 mm. To be able to reliably detect structures of this size range in the image of image recording device 18, an image having a resolution of at least 2-3 pixels/mm is selected. For 3 pixels/mm, the imaging of a measuring range of 700 mm, defined by slot length L, accordingly requires a surface image sensor 8 having a resolution of 2,100 pixels, at least in one direction of the image recording surface of surface image sensor 8.

Corresponding surface image sensors 8 are available on the market. However, the reasonably priced surface image sensors 8 available on the market have the disadvantage either that they are relatively expensive, or that images may be recorded only at low recording frequencies. A typical passenger vehicle tire 12 has a circumference of approximately 2,000 mm and a tire contact surface length of approximately 100 mm. With a design of the measuring system for a maximum drive-over speed of 15 km/h, the tire tread for image recording device 18 is visible through slot 14 for approximately 0.025 seconds, so that image recording device 18 must be designed for a frequency of at least 40 images per second.

A further difficulty in the provided use of standard commercially available surface image sensors 8 for a tread depth measurement through a slot 14 from below is that for maintaining maximum opening angle φ of ±20° using high-resolution surface image sensors 8, a distance D between the tire tread and surface image sensor 8 (recording distance) of approximately 1 meter is necessary. Such a recording distance requires an installation space of a corresponding size, or other design features.

As an alternative to a large installation space, it may therefore be provided to adjacently situate multiple relatively inexpensive image recording devices 18, whose surface image sensors 8 have a lower resolution but have a sufficiently high recording frequency, in longitudinal direction L of slot 14, transverse to travel direction F of vehicle 10.

Figure 6:
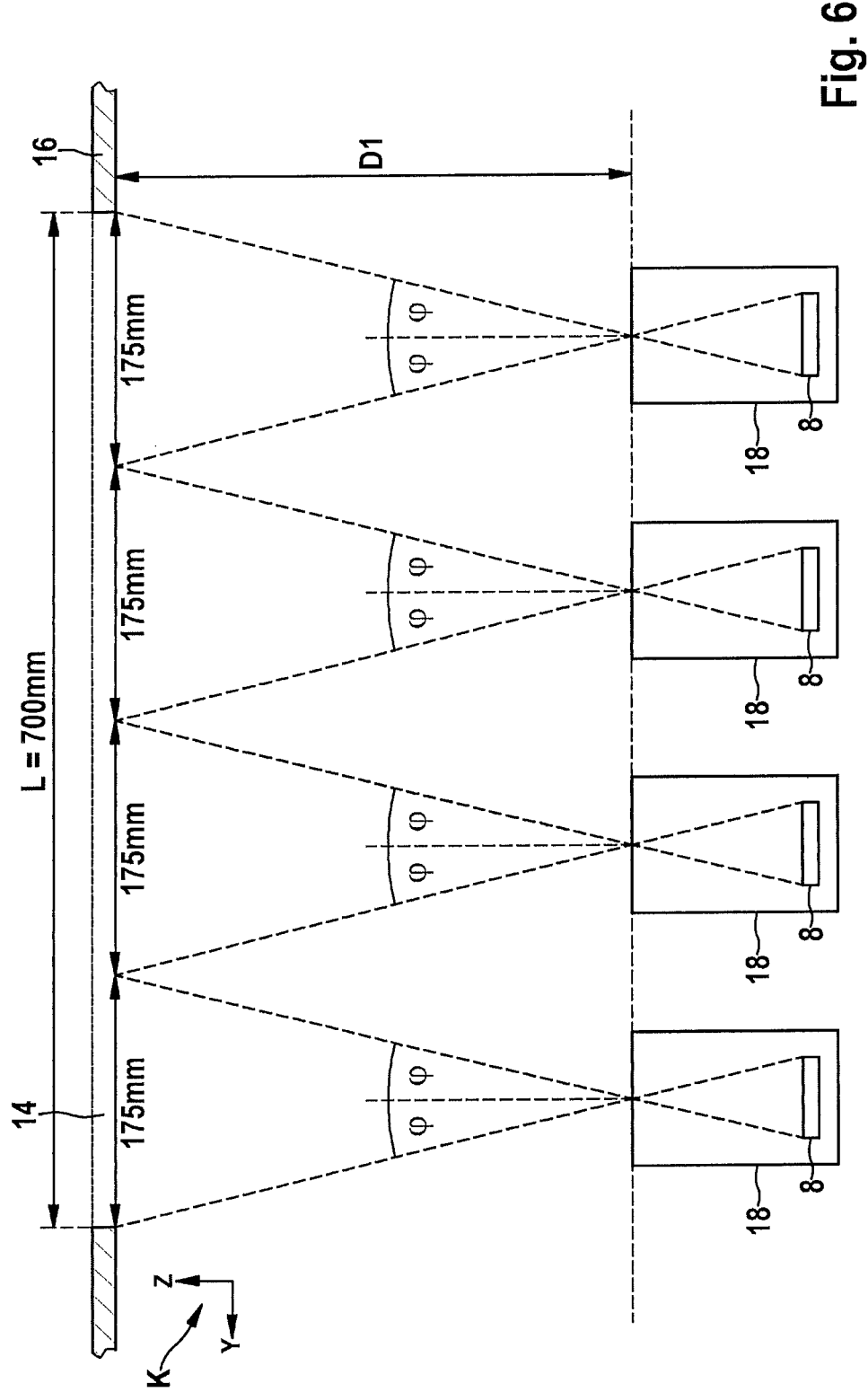
FIG. 6 shows a section of a device for tread depth measurement, using four image recording devices.

FIG. 6 shows an example of this type of arrangement, including four image recording devices 18, each of which is equipped with a surface image sensor 8, available on the mass market, having a sensor format of 640 pixels×480 pixels that are 7.5 μm×7.5 μm in size, and which is able to record images in a standard manner with a recording frequency of up to 60 images per second. In such an arrangement, recording distance D1 decreases to approximately 240 mm, resulting in an image scale of mb~36.

Using formula (1) known from optical 3D measuring technology, the depth measuring accuracy to be expected for the tread depth measuring device may be estimated as follows:

$$dZ = \frac{spx \times mb \times ps}{\tan(\delta)} = \frac{0.3 \text{ pixel} \times 36 \times 0.0075 \text{ mm/pixel}}{\tan(40°)} = 0.1 \text{ mm} \quad (2)$$

This estimation shows that with a device as shown in FIG. 6, the measuring accuracy of ±0.2 mm provided for a corresponding measuring system may be achieved, even if the subpixel measuring accuracy would be degraded due to interference effects.

The format of surface image sensors 8, opening angle φ=±20°, and recording distance D1=240 mm results in a rectangular object window 24 that is 175 mm×130 mm in size. Since width B of slot 14 is only 50 mm, as is apparent in FIG. 7a, almost two-thirds of the available image recording surface of surface image sensor 8 is not utilized.

This disadvantage may be remedied by an additional, linear optical system 22, such as a cylindrical lens 22, which is situated in beam path 7 between surface image sensor 8 and slot 14 and which has refractive power only in one spatial direction.

FIG. 7b shows such a cylindrical lens 22 in beam path 7 of image recording device 18, which compresses the visual range of surface image sensor 8 in travel direction F, resulting in an advantageous increase in the resolution to approximately 10 pixels/mm in the direction of width B of slot 14.

An alternative concept provides for using the non-square image format of surface image sensor 8 of image recording device 18 by a rotation by 90°, with a higher resolution of 640 pixels for measuring smaller object window width B. As a result, the resolution in the direction of width B of slot 14 increases to approximately 13 pixels/mm.

Figure 8B:
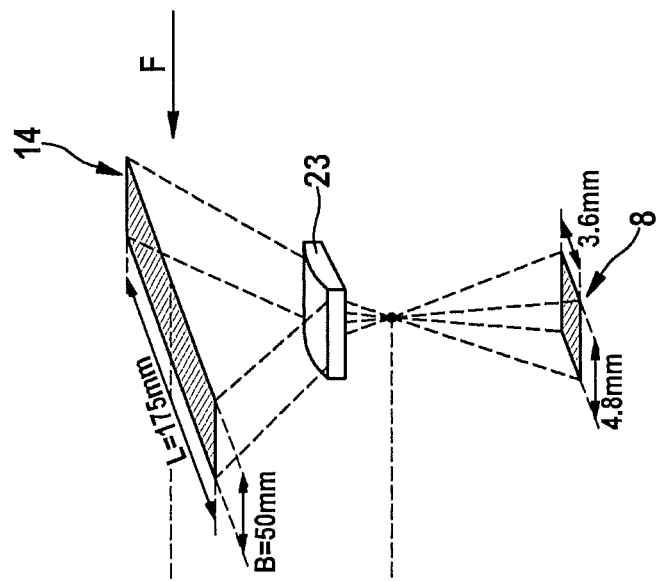
FIGS. 8a and 8b depict an improved utilization of a surface image sensor, using an alternative distorted optical image.
Figure 8A:
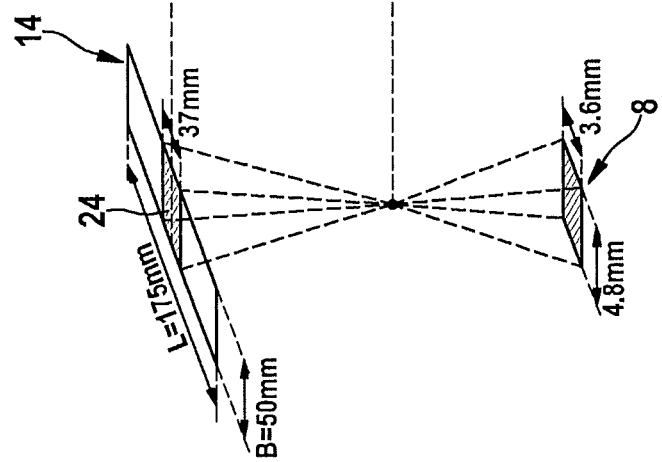

A further concept provides for reducing recording distance D1 to a recording distance D2<D1, for example, so that object window 24 is now only approximately 50 mm×37 mm, and the 50 mm of width B of object window 24 may be imaged on the 640 pixels of surface image sensor 8, as shown in FIG. 8a.

In this way, an even higher resolution for the depth measuring accuracy and a much higher measuring accuracy are achieved, which may be estimated according to formula (2) using a reduced image scale. As shown in FIG. 8b, the reduced size of object window 24 in the direction transverse to travel direction F may be compensated for by a cylindrical lens 23 which expands the image transversely with respect to travel direction F.

A further advantage of the arrangement shown in FIG. 8*b* is that typical distortion errors and shadowings of cylindrical lens 23 occur essentially in the direction transverse to travel direction F, which is less relevant for determining the tread depth.

A combination of a compression of the image in a direction in parallel to travel direction F according to FIG. 7*b*, and an expansion of the image in the direction transverse to travel direction F according to FIG. 8*b*, is also possible in order to optimize the image scale and the resolution in parallel as well as transversely with respect to travel direction F.

In one exemplary embodiment not shown in the figures, the normal imaging optical system of image recording device 18 is combined with linear optical system 22, 23 to form a joint optical system which has a different refractive power in the directions in parallel and transverse to travel direction F. Since recording device 18 in this case is provided with only a single lens which combines the properties of image recording device 18 and of linear optical system 22, 23 with one another, the design of image recording device 18 is simplified.

The accuracy and the robustness of the tread depth measurement may be further enhanced by increasing the number of light lines 6 projected onto the tread.

In accordance with regulatory guidelines, so-called wear indicators are integrated into the tread base of the tire tread which become elevated, with respect to the groove base, by the amount of the legally prescribed minimum tread depth. The measurement may be skewed by these elevations, as well as by other interfering objects such as dirt or jammed-in small stones, if the erroneous measurements are not robustly recognized as outliers and eliminated. Robust estimators, such as the RANSAC algorithm, for increasing the efficiency of estimation methods are known from mathematical statistics. Due to the provision of the wear indicators, which is sometimes prescribed, and their typical extension of approximately 6 mm to 10 mm in the running direction, the measured values may have a theoretical outlier percentage of 20% in the provided measuring window having a slot width of 50 mm. Depending on the placement of the wear indicators, which is freely selectable to a certain extent by tire manufacturers, and the random position of the wear indicators in the area of slot 14 at the time of the measurement, in only a few lines the outlier percentage, however, may assume a value of 0% in the best case, and a value of 100% in the worst case, so that recognizing whether outliers are present or which measured values are to be classified as outliers is not possible, or is possible only with a high level of uncertainty.

Figure 9:
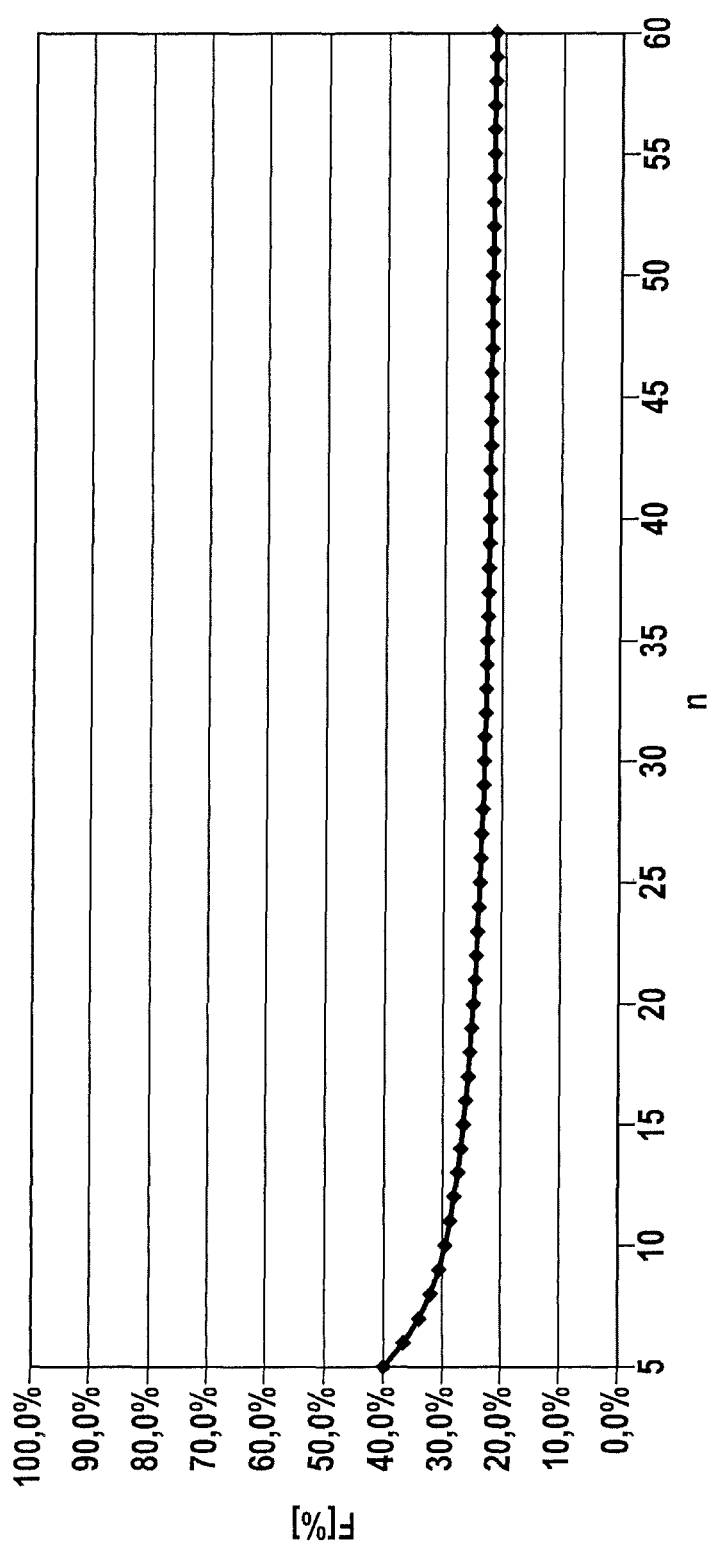
FIG. 9 is a graph showing the percentage of erroneous measurements as a function of the number of projected light lines.

In FIG. 9, the proportion of erroneous measurements (in percent) is plotted on the y axis as a function of number n of light lines 6 plotted on the x axis. With an increasing number n of light lines 6, the number of outliers in the worst case asymptotically approaches the theoretical outlier percentage (20% here).

The success of the outlier test is also a function of a limiting value to be specified, up to which limit a measured value is not considered as an outlier. The smaller the limiting value can be selected, the more reliably the outliers may be detected, accompanied by a lower computing effort, the more accurately the theoretical outlier percentage is known a priori.

Practical measurements have shown that at least thirty light lines 6 are advisable to ensure an absolute measuring accuracy of $\leq \pm 0.2$ mm with a robustness of $\geq 98\%$.

For a large number n of light lines 6, the localized, line-by-line scanning changes to surface scanning, which opens up additional options for measuring and assessing the tire tread. A further advantage of a high scanning density is that the wear indicators may be reliably detected as such and measured, since this improves the relative measuring accuracy and reliability of the results. In this regard, the knowledge is useful that the wear indicators for most tire treads have an extension of approximately 10 mm in the running direction, which for a large number of lines 6 may be more easily segmented. In addition, there is the further option of being able to provide information about damage such as erosion or sawtooth formation in the tread, or to recognize one-sided wear of the tread due to an incorrect camber. Furthermore, the high scanning density may be used to make a distinction, based on the different tread structures, as to whether the tire is a summer tire, winter tire, or all-season tire.

The width of a light line 6 in the image on surface image sensor 8 is a function of the quality of the imaging optical systems of illumination device 4 and of image recording device 18, of the surface roughness, and of further effects such as scattered light and speckle. Imaging effects may therefore be tolerated quite well when they systematically contribute to line broadening. As already mentioned, the width of an imaged light line 6 is crucial for the line point measuring accuracy. Based on the requirement of an optimal line width of approximately five pixels for the line point measurement in the subpixel range, and assuming a minimum spacing of one pixel for separating light lines 6, it may be concluded that a maximum of 106 light lines 6 is theoretically possible when, as described in the example, 640 pixels are available on surface image sensor 8.

From the viewpoint of the object, generating light lines 6 having a line width of 0.3 mm or less is technically possible, so that, assuming a line spacing of 0.2 mm, for example, approximately one hundred light lines 6 may be projected into a slot 14 having a width B of 50 mm.

The suitable width of projected light lines 6 is therefore a function of the imaging geometry and imaging error inherent to the system, and is specified in such a way that, as a result of all influencing factors, a line width in the image on surface image sensor 8 of approximately five pixels results, and at least thirty light lines 6 may be imaged.

For a large number of light lines 6 and a resulting small spacing between individual light lines 6, as a function of the depth extension of the object and of angle $\delta$ between the projection direction of illumination device 4 and the recording device of image recording device 18 on the object, an unambiguous association of the image of a light line 6*a* on surface image sensor 8 with a projected light line 6 is no longer easily possible.

To allow an unambiguous association, the shift of light beam 5 in the image which results from the object depth and the recording geometry must be smaller than the spacing of imaged lines 6*a* in the image. From formula (2) and the parameters stated there for image resolution and recording configuration, it may be deduced, for example, that a change in depth of approximately 1 mm corresponds to a shift of the light beam by approximately 3 pixels on surface image sensor 8. If the tread depth of a brand new tire 12 is based on 8 mm to 9 mm, a shift of the line segments of the groove base with respect to the tread by approximately 9 mm*3 pixels/mm=27 pixels results in the image for the tread depth of 9 mm.

Taking into account an additional, optimal line width of approximately 5 pixels, for an available resolution of 640 pixels for light lines 6 having constant mutual spacing, the limit of the unambiguous association is achieved at twenty light lines 6 maximum. For a larger number of light lines 6, distinguishing between individual light lines 6 becomes increasingly difficult and prone to error.

A decrease in intersection angle δ increases the possible number of light lines 6 while maintaining the unambiguousness of the association. However, it is likewise apparent from formula (2) that the depth measuring accuracy decreases with a smaller intersection angle δ. For achieving the high measuring accuracy necessary for the tread depth measurement provided here, a large intersection angle δ of 40° is preferred, and for the unambiguous association of a large number of light lines 6 which overlap in the image due to the mentioned conditions, encoding of light lines 6 is carried out as an additional measure in order to resolve ambiguities.

A first, simple option for spatial line encoding is to vary the spacings between adjacent light lines 6; i.e., illumination device 4 simultaneously illuminates the section of the tire tread to be measured, using multiple light lines 6 which all have the same width but different spacings from one another.

Figure 10:
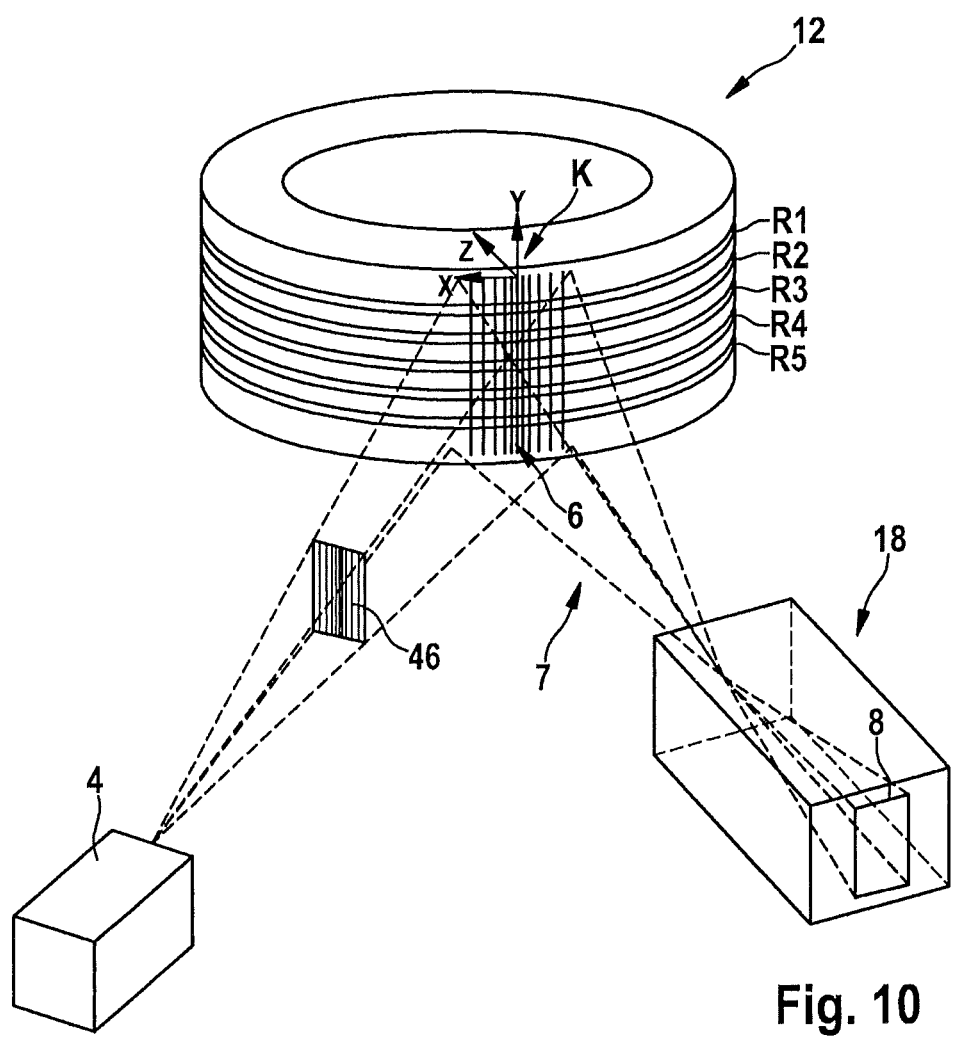
FIG. 10 depicts a measurement using light lines whose spacing from the respective adjacent lines varies.

FIG. 10 shows as an example a plurality of light lines 6 whose spacings from the respective adjacent line continuously increase from the center line to the edges on the left and the right. The line segments imaged on image surface sensor 8 are not illustrated in FIG. 10 in order to keep the illustration simple.

One or multiple diffractive optical elements 46 may be used for generating an encoded line pattern having variable line spacing, as shown in FIG. 10.

An alternative design provides temporal encoding of light lines 6 or a combination of spatial and temporal encoding of light lines 6. A number of unambiguously determinable light lines 6 are projected multiple times, but temporally and spatially shifted, onto the tread section to be measured. The illumination frequency of illumination device 4 and the recording frequency of image recording device 18 must be appropriately synchronized. In addition, the number of required illumination devices 4 increases if a programmable line projector is not used as illumination device 4.

In another alternative exemplary embodiment, light lines 6 having different wavelengths (colors) are projected onto the tread section to be measured, and one or multiple image recording devices 18 which is/are provided with a color sensor is/are used, so that light lines 6 having different wavelengths (colors) may be separately evaluated.

All of the above-described encodings may also be arbitrarily combined with one another to optimize the unambiguousness of the association and/or to even further increase the number of distinguishable light lines 6.

During travel over slots 14 in roadway 16, only in exceptional cases are tires 12 detected by only one measuring module 26, i.e., a combination of an illumination device 4 and associated image recording device 18. Tires 12 are generally imaged in the image sequences of at least two adjacent measuring modules 26. This is due, on the one hand, to the width of tires 12, which is often greater than length L of slots 14 where L=175 mm, and on the other hand, to the random lane, which cannot be exactly and reliably limited to a single measuring module 26. Light lines 6 of both measuring modules 26 are imaged in the area of overlap of adjacent measuring modules 26. This makes an unambiguous association of light lines 6 more difficult. The above-described encoding of light lines 6 must therefore also be suitable for being able to unambiguously associate light lines 6 of adjacent measuring modules 26 with the particular measuring module 26.

In addition to a combination of the encodings provided above, which require various DOEs 46 and/or additional technical effort, a DOE 46, for example, which generates an asymmetrically encoded line pattern provides a simple, cost-effective option for identifying light lines 6 of adjacent measuring modules 26, for example by using the uniform DOE 46, used for all measuring modules 26, in adjacent measuring modules 26 in an arrangement which is mutually rotated in particular by 180°.

An alternative concept as shown in FIG. 14 provides for designing the structure of measuring modules 26 asymmetrically, and mounting adjacent measuring modules 26 in an orientation which is mutually rotated by 180° in each case, so that slots 14 are offset relative to one another in travel direction F. This prevents light lines 6 from being projected into the measuring range of adjacent measuring modules 26, and allows an approach using measuring modules 26 having a uniform design. In this exemplary embodiment, the interaction of slots 14 also allows complete detection of the tire tread, regardless of the random lane.

Figure 11:
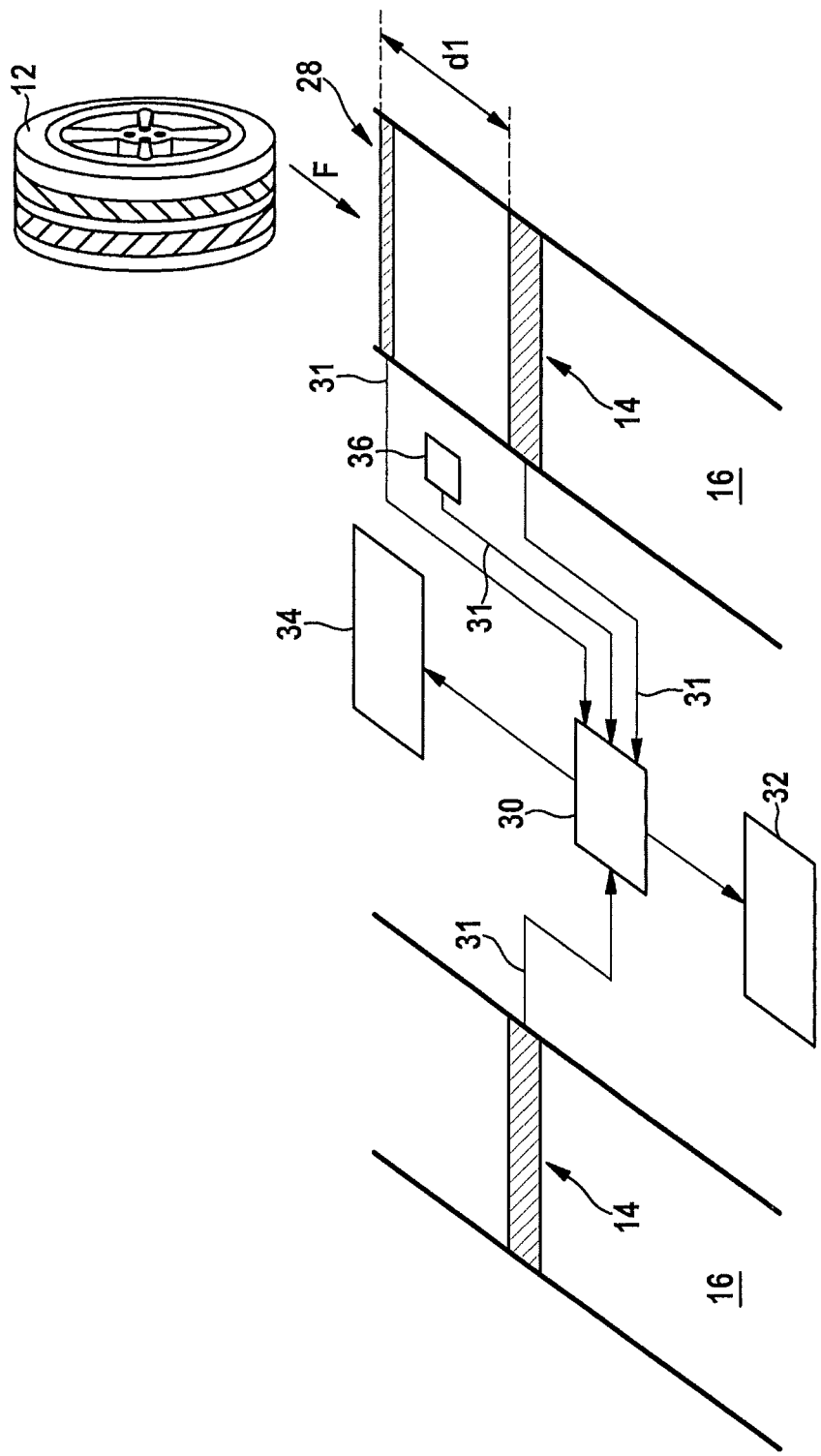
FIG. 11 shows a schematic view of a device for measuring the tread depth in or on a roadway transversely with respect to the travel direction of a motor vehicle.

FIG. 11 shows, as an example, one exemplary embodiment of a device for measuring the tread depth in or on a roadway 16 transversely with respect to travel direction F of a motor vehicle 10. A complete test system includes at least two measuring devices, one for each side of the vehicle.

The measuring devices for measuring the tread depth of tires 12 on both sides of the vehicle are connected via cables 31 or wirelessly to a shared measuring and evaluation device 30. Measuring and evaluation device 30 is connected to a display device 32 for displaying the results, and is connected to a server 34 as needed.

The described device may include an additional sensor 28 which is designed for detecting a vehicle 10 traveling onto the device. Additional sensor 28 is connected to measuring and evaluation device 30, and transfers measuring and evaluation device 30 from an idle state into the measuring state immediately before vehicle 10 travels over.

Additional sensor 28 may be a contact switch which is triggered by a tire 12 traveling onto the test system. Additional sensor 28 may also be used for determining the speed of vehicle 10: for a known distance d1 between additional sensor 28 and slot 14 for tread depth measurement, the speed of vehicle 10 may be ascertained by measuring the time that elapses between triggering additional sensor 28 and traveling over slot 14.

In addition, an environmental sensor 36 may be provided which is a light-sensitive sensor, for example, and which is used for optimizing the illumination and imaging, in that environmental sensor 36 continuously or within a predefined time interval measures the intensity of the ambient light (daytime, nighttime, sunlight, clouds, etc.).

Environmental sensor 36 is also connected to measuring and evaluation device 30 of the measuring system. Measuring and evaluation device 30 analyzes the sensor data and provides optimal parameters for illumination device 4 (illumination intensity, for example) and/or image recording device 18 (integration time, for example), which prevent underexposure and overexposure during the measurements.

In one exemplary embodiment, an additional image recording device may at the same time implement the functions of contact sensor 28 and of environmental sensor 36, and is able to detect a vehicle 10 approaching the measuring device and also to analyze the ambient light. The additional image recording device may optionally also ascertain the license plate of vehicle 10, thus allowing the measuring results to be automatically associated with vehicle 10.

In one alternative exemplary embodiment, image recording device 18 itself of the measuring device is used as the sensor for analyzing the intensity of the ambient light. In a separate measuring mode, the intensity of the ambient light is analyzed continuously or within a predefined time interval, and the optimal parameters for tread depth measurement are continuously ascertained. As soon as a vehicle 10 approaches the measuring device, the measuring mode of the measuring device is switched to the actual tread depth measurement, and the previously ascertained parameters are used in the tread depth measurement.

Measuring and evaluation device 30 is equipped with a central processing unit (CPU), a random access memory (RAM), and evaluation software, for example, and carries out the analysis of the measuring data of environmental sensor 36, the computation of the vehicle speed, an image analysis for distinguishing the type of tire for computing the tread depth, tread depth deviation, and surface tread structure of each tire 12, a computation of the relative deviation of the tread depths and tread depth deviation of tires 12 on each axle, an assessment of the tread depth, tread depth deviation, and tread structure for each tire 12 based on defined limiting values, an assessment of the relative deviation and the difference of the tread depth deviation of tires 12 on one axle based on defined limiting values, and a summary tire diagnosis for the overall vehicle, and controls display device 32 for outputting the test results and, if necessary, for transmitting the results of the testing and evaluation to higher-level server 34.

Figure 12:
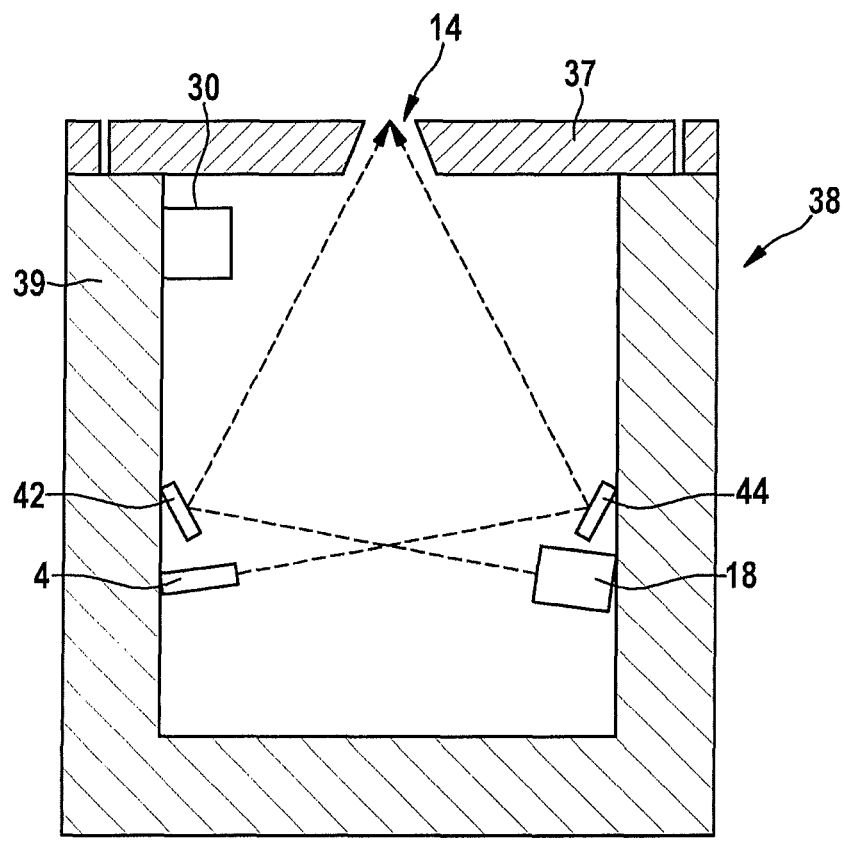
FIG. 12 shows a side sectional view of a device, situated in a drive-over channel, for measuring the tread depth.

A measuring system according to the present invention may advantageously be integrated into a drive-over channel 38, as is known and established from road construction. FIG. 12 shows one exemplary embodiment (without the illustration of the connecting cables) including such a drive-over channel 38, in cross section. For optimizing the available installation space, the imaging and the illumination lines are deflected via mirrors 42, 44. Due to a symmetrical arrangement of optical elements 4, 18, 42, 44, the beam lengths for illumination device 4 and image recording device 18 are identical, and therefore the fan angle of light planes 5 of illumination device 4 is equal to opening angle φ of image recording device 18.

Installation of optical elements 4, 18, 42, 44 and of measuring and evaluation device 30 on a side wall 39 of drive-over channel 38 protects optical elements 4, 18, 42, 44 and measuring and evaluation device 30 from, for example, backed-up water which accumulates at the base of drive-over channel 38. Installing all components 4, 18, 42, 44, 30 of the measuring system on a cover 37 of drive-over channel 38 allows simple maintenance and/or replacement of components 4, 18, 42, 44, 30. Contact sensor 28 and environmental sensor 36 are not illustrated in FIG. 12. They may be situated in cover 37, or also outside drive-over channel 38.

FIG. 13 shows drive-over channel 38 in a first exemplary embodiment of a measuring device according to the present invention for measuring the tread depth on one side of the vehicle, using a system of four measuring modules 26 which are adjacently situated transversely with respect to travel direction F and which have a shared slot 14, in the top view. The illustration of the connecting cables has once again been omitted for reasons of clarity. For the measurement, a vehicle 10 travels from bottom to top in this illustration (in travel direction F), or from top to bottom over slot 14.

FIG. 14 shows drive-over channel 38 in a simplified illustration without optical elements 4, 18, 42, 44, evaluation device 30, and the connecting cables, in a second exemplary embodiment, including a system of four adjacently situated measuring modules 26 which have an asymmetrical design and are situated in drive-over channel 38 mutually rotated by 180° in each case, so that the four slots 14 in travel direction F are situated mutually offset relative to one another. Slots 14 are designed in such a way that they jointly cover the entire width of drive-over channel 38, and no gap is present in slot 14 transverse to travel direction F. For the measurement, a vehicle 10 travels from bottom to top in this illustration (in travel direction F), or from top to bottom over slots 14.

Slot 14 may be closed by a transparent layer made of glass or Plexiglass, for example, to protect optical elements 4, 18, 42, 44 from dirt and moisture.

A measurement is valid when all light lines 6 are imaged on image surface sensor 8. Under favorable conditions, i.e., for large tire contact surface lengths (the tire contact surface length is a function of the type of tire, the tire pressure, and the wheel load), valid measuring results may be achieved at a recording frequency of 60 images per second, even at speeds of greater than 15 km/h, when at least one image is detected which includes all lines.

If not all light lines 6 are imaged on image surface sensor 8, the measurement is assessed as invalid. In addition, if the drive-over speed exceeds a predefined limiting value of 15 km/h, for example, an excessive speed is identified as a possible reason for the erroneous measurement.

The system shown in FIG. 14 provides an option for measuring speed without additional sensors or contact switches 28, in which slots 14 are situated offset relative to one another with a known spacing d2 in travel direction F. The measurement of the temporal shift during travel over slots 14 of adjacent measuring modules 26 takes place by a correlation analysis of recorded light lines 16 in the image sequences of adjacent measuring modules 26.

During a measurement, vehicle 10 travels initially with a front wheel 12 and then with a rear wheel 12 over slot 14 or slots 14 of the measuring system. Thus, by use of a measuring system, the tread depths of all wheels 12 on one side of the vehicle may be determined virtually simultaneously in one measuring operation.

The results are subsequently automatically assessed for all wheels 12, and via a signal light, for example, are displayed to the driver of the vehicle in colors and/or by a suitable assessment message.

The tread depth is assessed based on the legally prescribed minimum tread depth of 1.6 mm and a limiting value, recommended for driving safety reasons, of 3 mm to 4 mm for the warning of severely worn tires having little remaining useful life.

If a measured tread depth is below the predefined warning value, the signal light color "yellow" is output, and if the measured tread depth is below the minimum tread depth, the signal light color "red" is output; otherwise, the signal light color "green" is output.

TABLE 1

| Event | Additional measured value | Assessment message | Signal light color |
|---|---|---|---|
| winter | summer tire tread depth | wrong tire type | red |
| summer | winter tire tread depth | check tire type | yellow |
| average tread depth ≤1.6 mm | | minimum tread depth reached | red |
| summer tire: average tread depth <3 mm and >1 mm | | check tire wear | yellow |
| winter tire: average tread depth <4 mm and >1.6 mm | | check tire wear | yellow |
| summer tire: average tread depth ≥3 mm | | | green |
| winter tire: average tread depth ≥4 mm | | | green |
| summer tire: average tread depth ≥3 mm | tread depth deviation over tire width > limiting value | tire wear on one side, check chassis | yellow |
| winter tire: average tread depth ≥4 mm | tread depth deviation over tire width > limiting value | tire wear on one side, check chassis | yellow |
| summer tire: average tread depth ≥3 mm | depth of surface tread structure > limiting value | check tire wear | yellow |
| winter tire: average tread depth ≥4 mm | depth of surface tread structure > limiting value | check tire wear | yellow |

The fact that the tread depth for tires 12 on one axle should generally be same, but may definitely differ between tires 12 on the front and the rear axle, represents a further test criterion for the tire tread depth:

TABLE 2

| Event | Additional measured value | Assessment message | Comment | Signal light color |
|---|---|---|---|---|
| average tread depth on both wheels summertires ≥3 mm, winter tires ≥4 mm | difference in average left/right tread depth > limiting value | tire wear different, check tire pressure, tire quality | assignment to the wheel with the lower tread depth, signal light color "green" is overwritten | yellow |
| average tread depth on both wheels summer tires ≥3 mm, winter tires ≥4 mm | difference in left/right tread depth deviation over the tire width > limiting value | tire wear different, check chassis | assignment to both wheels on the axle, signal light color "green" is overwritten | yellow |

Since the same tire is always mounted on an axle when a tire is changed over the service life of the vehicle, a relative tread depth analysis provides an additional option for checking deviations between the left and right wheel on an axle. The difference between the two tread depths should not exceed a defined limiting value. If the limiting value is exceeded, this indicates an incorrect tire pressure or tires of different quality, and the signal light color "yellow" is output. A tread depth which varies over the tire width results in a message concerning an incorrect chassis setting. If a limiting value predefined for this purpose is exceeded, the signal light color "yellow" is output:

TABLE 3

| Event | Additional measured value | Assessment message | Comment | Signal light color |
|---|---|---|---|---|
| all wheels were assessed "green" | | | | green |
| at least one wheel was assessed "yellow" | | excessive tire wear | | yellow |
| at least one wheel was assessed "red" | | excessive tire wear | | red |
| the minimum required line number is not achieved in at least one image | v >15 km/h | measurement invalid; excessive speed | evaluation terminated; no further analyses | red |
| the minimum required line number is not achieved in at least one image | v <15 km/h | measurement invalid | evaluation terminated; no further analyses; information sent to service center | red |

The output on a display device for the driver preferably shows only a result for the overall vehicle:

TABLE 4

| | Assessment message | Signal light color |
|---|---|---|
| result of tire diagnosis | check tire wear | red |
| left front tire | tire wear normal | green |
| right front tire | minimum tread depth reached | red |
| left rear tire | tire wear normal | green |
| right rear tire | tire wear on one side, check chassis | yellow |

A method according to the present invention for tread depth measurement on a vehicle axle may thus include the following method steps overall:

1. Analyzing the ambient light (daytime, nighttime, sunlight, clouds) and setting the illumination intensity of illumination devices 4 and the integration time of image recording devices 18.
2. Activating the measuring system when a vehicle 10 approaches.
3. Illuminating the slot with multiple encoded light lines 6 and continuously detecting and storing the images from image recording devices 18 when tire 12 rolls over (on both sides of the vehicle, using one measuring system in each case).
4. Determining the traveling speed.
5. Carrying out the image analysis with clear identification of individual light lines 6 (decoding), determining all line points for each tire 12.

6. Computing the tread depth for each tread groove R1, R2, R3, R4, R5 and light line 6 for each tire 12. Ascertaining a representative tread depth value for each groove R1, R2, R3, R4, R5 from the information from all light lines 6.

7. Computing an average tread depth for each tire 12 from the tread depths of all tread grooves R1, R2, R3, R4, R5, and computing the tread depth deviation over the width of tire 12.

8. Checking the validity of the measurement of each tire 12.

8a. If not all light lines 6 are imaged in at least one image, and the computed speed is greater than the limiting value, vehicle 10 is assigned the state "measurement invalid, excessive speed: signal light color red." The evaluation is terminated. There is no further analysis; instead, an appropriate output to the driver is made according to method step 15.

8b. If not all light lines 6 are imaged in at least one image, and the computed speed is less than the limiting value, vehicle 10 is assigned the state "measurement invalid (not ready for measurement): signal light color red." The evaluation is terminated. There is no further analysis; instead, an appropriate output to the driver and to the service center is made according to method step 15.

9. Ascertaining the surface tread structure from the determined line points of each tire 12.

10. Analyzing the tread structure and determining the type of each tire 12.

10a. If the tire type is identified as a summer tire during winter, this tire 12 is assigned the state "wrong tire type: signal light color red."

10b. If the tire type is identified as a winter tire during summer, this tire 12 is assigned the state "check tire type: signal light color yellow."

11. Assessing the average tread depth of each tire 12 by comparing the measured tread depth to defined limiting values (the limiting values for summer tires and winter tires may be different).

11a. If the average tread depth has reached or is below the legally prescribed minimum tread depth, this tire 12 is assigned the state "minimum tread depth reached: signal light color red."

11b. If the average tread depth is between the legally prescribed minimum tread depth and the safety-relevant limiting value, this tire 12 is assigned the state "check tire wear: signal light color yellow."

11c. If the average tread depth is greater than or equal to the safety-relevant limiting value, this tire 12 is assigned the state "signal light color green."

12. Assessing the deviation of the tread depth over the tire width of each tire 12, based on a defined limiting value when the average tread depth is greater than or equal to the safety-relevant limiting value.

12a. If the tread depth deviation exceeds the limiting value, this tire 12 is assigned the state "tire wear on one side, check chassis: signal light color yellow."

13. Analyzing the surface tread structure of each tire 12 in the running direction for the presence of a sawtooth structure and erosion, and assessing, based on a defined limiting value, when the average tread depth is greater than or equal to the safety-relevant limiting value.

13a. If the depth of the surface tread structure exceeds the limiting value, this tire 12 is assigned the state "check tire wear: signal light color yellow."

14. Determining the relative difference of the average tread depth and the tread depth deviation over the width of tires 12 on one axle and comparing to predefined limiting values, when the average tread depth of both tires 12 is greater than or equal to the safety-relevant limiting value.

14a. If the computed difference of the average left/right tread depth is greater than the limiting value, tire 12 having the lower tread depth is assigned the state "tire wear different, check tire pressure, tire quality: signal light color yellow"; the signal light color "green" is overwritten.

14b. If the computed difference of the tread depth deviation over the width of the left/right tire is greater than the limiting value, both tires 12 on the axle are assigned the state "tire wear different, check chassis: signal light color yellow"; the signal light color "green" is overwritten.

15. Determining the state for the overall vehicle.

15a. If all tires 12 have been assessed with the signal light color "green," the overall vehicle is assigned the state "signal light color green."

15b. If at least one tire 12 has been assessed with the signal light color "yellow," the overall vehicle is assigned the state "check tire wear, signal light color yellow."

15c. If at least one tire 12 has been assessed with the signal light color "red," the overall vehicle is assigned the state "check tire wear, signal light color red."

15d. If not all light lines 6 have been imaged in at least one image and the computed speed is greater than the limiting value, vehicle 10 is assigned the state "measurement invalid, excessive speed: signal light color red."

15e. If not all light lines 6 have been imaged in at least one image and the computed speed is less than the limiting value, vehicle 10 is assigned the state "measurement invalid (not ready for measurement): signal light color red"; in addition, the service center is informed.

16. Visual display of the test result for the driver:

16a. Result of the tire diagnosis for overall vehicle 10 with plaintext of the description of the ascertained state and/or the signal light color associated with the state.

16b. Optional result of the tire diagnosis for each individual tire 12 with plaintext of the description of the ascertained state and/or the signal light color associated with the state and/or the ascertained measured values for assessing individual tire 12 and/or for making a comparative assessment of tires 12 on one axle.

17. Optional transmission of the measuring data and results to a server 34.

The method steps for a two-axle vehicle 10 include above-described method steps 3 through 14 for the front axle, directly followed by the same method steps 3 through 14 for the rear axle. Method steps 15 through 17 are carried out simultaneously for all tires 12 of the vehicle.

What is claimed is:

1. A device for measuring a tread depth of a tire, comprising:
   at least two measuring modules which each include (i) at least one illumination device which is configured and situated in such a way to project light lines onto the tread to be measured, and (ii) at least one image recording device which is configured for recording at least one image of at least one area of the tread to be measured;
   wherein:
     the at least one illumination device and the at least one image recording device are configured and situated in such a way that an illumination direction of the illumination device and an image recording direction of the image recording device are oriented neither in parallel to one another nor orthogonally with respect to the tread of the tire, the at least two measuring modules are situated transversely with respect to the running direction of the tire and connected to a shared evaluation device, each of the at least two measuring modules is a non-portable measuring module, the illumination devices are configured such that the individual light lines are encoded to be identifiable and unambiguously associatable with one of the measuring modules, the encoding includes a temporal encoding, in the temporal encoding, one of the measuring modules projects the light lines at different times from each other according to a temporal pattern that is associatable with only the one of the measuring modules projecting the temporal pattern.

2. The device as recited in claim 1, wherein the illumination devices of the measuring modules are each configured for projecting a pattern having multiple light lines onto the tread, and wherein the illumination devices each include at least one diffractive optical element for generating the pattern.

3. The device as recited in claim 1, wherein the image recording devices each include at least one optical element configured for distorting the image recording range of the image recording device, including at least one of (i) compressing the image recording range in parallel to the running direction of the tire, and (ii) expanding the image recording range transverse to the running direction of the tire.

4. The device as recited in claim 1, wherein the image recording devices each include a surface image sensor which (i) has a different number of pixels in two directions of a surface of the image sensor, and (ii) is situated in such a way that a surface direction having the higher number of pixels is situated in parallel to the travel direction of the vehicle.

5. The device as recited in claim 1, wherein the measuring modules are provided next to one another, and the diffractive optical elements of directly adjacent measuring modules are oriented twisted against each other to generate differently encoded light patterns.

6. The device as recited in claim 1, wherein the measuring modules are configured in such a way that the illumination devices and image recording devices are situated offset relative to one another in the running direction of the tire to be measured.

7. The device as recited in claim 1, wherein an opening angle of the image recording device and a fan angle of the light plane of the illumination device is ±20°, and the angle between the illumination direction of the illumination device and the image recording direction of the image recording device is 20° to 45°.

8. The device as recited in claim 1, further comprising:
at least one additional sensor configured for detecting at least one of an approach of a tire and an illumination of the tire tread.

9. The device as recited in claim 1, wherein each one of the at least two measuring modules is adapted to be embedded under a roadway.

10. The device as recited in claim 1, wherein:
a first one of the at least two measuring modules measures a tread of a first tire of a vehicle, and
a second one of the at least two measuring modules measures a tread of a second tire of the vehicle that is different than the first tire.

11. The device as recited in claim 1, wherein in the temporal encoding the light lines are projected according to a predetermined chronological sequence.

12. The device as recited in claim 1, wherein the light lines of the variable spacing pattern extend in a plane that is perpendicular to a projecting direction of the one of the measuring modules that projects the variable spacing pattern.

13. A method for measuring a tread depth of a tire, comprising:
rolling the tire to be measured over a measuring device, the measuring device having at least two measuring modules which each include (i) at least one illumination device which is configured and situated in such a way to project light lines onto the tread to be measured, and (ii) at least one image recording device which is configured for recording at least one image of at least one area of the tread to be measured, wherein:
the at least one illumination device and the at least one image recording device are configured and situated in such a way that an illumination direction of the illumination device and an image recording direction of the image recording device are oriented neither in parallel to one another nor orthogonally with respect to the tread of the tire,
the at least two measuring modules are situated transversely with respect to the running direction of the tire and connected to a shared evaluation device,
each of the at least two measuring modules is a non-portable measuring module;
the illumination devices are configured such that the individual light lines are encoded to be identifiable and unambiguously associatable with one of the measuring modules,
the encoding includes a temporal encoding,
projecting, with the illumination devices, the light lines onto the tread of the tire to be measured, wherein:
in the temporal encoding, one of the measuring modules projects the light lines at different times from each other according to a temporal pattern that is associatable with only the one of the measuring modules projecting the temporal pattern;
recording, with the image recording devices, at least one reflected image of the tread in each case;
identifying the light lines in the recorded images and associating the light lines with one of the illumination devices; and
determining the depth of the tread by evaluating the recorded images of the light lines.

14. The method as recited in claim 13, further comprising:
determining a speed of the tire; and
aborting the method when a permissible maximum speed is exceeded.

15. The method as recited in claim 14, further comprising:
comparing the determined tread depth to a predefined limiting value; and
outputting a warning when the determined tread depth is less than the predefined first limiting value.

16. The method as recited in claim 14, further comprising:
comparing the tread depths determined for tires on one axle; and
outputting a warning when the difference between the tread depths of the tires on the one axle is less than a predefined second limiting value.

17. The method as recited in claim 14, further comprising:
optimizing imaging parameters including at least one of an illumination intensity of the illumination device and an integration time of the image recording device.

18. The method as recited in claim 13, wherein each one of the at least two measuring modules is adapted to be embedded under a roadway.

19. The method as recited in claim 13, wherein:
   a first one of the at least two measuring modules measures a tread of a first tire of a vehicle, and
   a second one of the at least two measuring modules measures a tread of a second tire of the vehicle that is different than the first tire.

20. The device as recited in claim 13, wherein in the temporal encoding the light lines are projected according to a predetermined chronological sequence.

21. The method as recited in claim 13, wherein the light lines of the variable spacing pattern extend in a plane that is perpendicular to a projecting direction of the one of the measuring modules that projects the variable spacing pattern.

\* \* \* \* \*